United States Patent
Buchbinder

(10) Patent No.: US 10,102,507 B2
(45) Date of Patent: Oct. 16, 2018

(54) SYSTEMS AND METHODS TO FACILIATE REPLACEMENT OF DEPLETED BATTERIES

(71) Applicant: Google LLC, Mountain View, CA (US)

(72) Inventor: Charles Prince Buchbinder, San Carlos, CA (US)

(73) Assignee: Google LLC, Mountain View, CA (US)

( * ) Notice: Subject to any disclaimer, the term of this patent is extended or adjusted under 35 U.S.C. 154(b) by 967 days.

(21) Appl. No.: 14/496,816

(22) Filed: Sep. 25, 2014

(65) Prior Publication Data

US 2016/0092847 A1    Mar. 31, 2016

(51) Int. Cl.
*G06Q 30/00*    (2012.01)
*G06Q 10/00*    (2012.01)
*G06Q 30/06*    (2012.01)

(52) U.S. Cl.
CPC ......... *G06Q 10/20* (2013.01); *G06Q 30/0633* (2013.01); *G06Q 30/0635* (2013.01)

(58) Field of Classification Search
CPC .... G06Q 50/01; G06Q 30/06–30/0645; G06Q 30/08; G06Q 10/20; G08B 3/00; G08B 5/00; G08B 5/36; H04L 12/2803; H04L 12/2823; H04W 4/00; H04W 24/00; H04W 88/00; H04W 88/02; H04W 88/04
See application file for complete search history.

(56) References Cited

U.S. PATENT DOCUMENTS

| 6,794,849 | B2 | 9/2004 | Mori et al. |
| 7,750,639 | B2 | 7/2010 | Quint et al. |
| 2002/0161652 | A1* | 10/2002 | Paullin ................. B65D 79/00 705/22 |
| 2007/0063675 | A1 | 3/2007 | Walline et al. |
| 2007/0124608 | A1 | 5/2007 | Knowlson et al. |
| 2011/0218703 | A1 | 9/2011 | Uchida |
| 2012/0214515 | A1 | 8/2012 | Davis et al. |

(Continued)

OTHER PUBLICATIONS

Zaker, "Fiber-Wireless Sensor Broadband Access Network Integration (Fi-WSN) for the Smart Grid," University of Ottawa (Canada), ProQuest Dissertations Publishing, 2013, 98pp. (Year: 2013).*

(Continued)

*Primary Examiner* — Adam L Levine
(74) *Attorney, Agent, or Firm* — Kilpatrick Townsend & Stockton LLP

(57) ABSTRACT

In an embodiment, a method facilitates battery replacement in a smart-home system. The method includes measuring, by one or more smart-home devices, at least one characteristic of a first battery in one of the smart-home devices, and determining from the at least one characteristic, whether replacement of the first battery is warranted. If replacement is warranted, the method sends an electronic order to a supplier for a replacement battery. The method further includes reading, by one or more of the smart-home devices, a machine readable code that accompanies a shipment of the replacement battery, embodying information from which an identity of the first smart-home device can be determined; determining, based at least in part on the information, a location of the first smart-home device; and providing, by one or more of the smart-home devices, visual and/or audible information to guide a user to the first smart-home device.

24 Claims, 16 Drawing Sheets

(56) References Cited

U.S. PATENT DOCUMENTS

| | | |
|---|---|---|
| 2012/0306661 A1 | 12/2012 | Xue et al. |
| 2014/0085093 A1 | 3/2014 | Mittleman et al. |
| 2014/0180711 A1 | 6/2014 | Kamen et al. |
| 2014/0266669 A1 | 9/2014 | Fadell et al. |
| 2015/0159895 A1* | 6/2015 | Quam .................... F24F 11/006 700/275 |

OTHER PUBLICATIONS

International Search Report and Written Opinion dated Nov. 23, 2015 for International Patent Application No. PCT/US2015/048021 filed Sep. 2, 2015, 14 pages.

* cited by examiner

SYSTEMS AND METHODS TO FACILIATE REPLACEMENT OF DEPLETED BATTERIES

BACKGROUND

Users of battery powered devices in the home and workplace have to replace batteries from time to time, to avoid disruption of services to which they have become accustomed or dependent. In an environment in which numerous battery powered devices exist, it may be burdensome or difficult for a user to identify which device(s) require a replacement battery. This may be further complicated where a variety of battery types are utilized. The increased burden of numerous devices continually requiring replacement battery re-ordering may lead to a poor perception of a device or platform of devices that necessitate frequent and unplanned interventions.

SUMMARY

In an embodiment, a method facilitates battery replacement in a smart-home system that includes a plurality of smart-home devices in a home. The method includes measuring, by one or more of the smart-home devices, at least one characteristic representative of a condition of a first battery contained in a first of the smart-home devices, and determining from the at least one characteristic, by one or more of the smart-home devices, whether replacement of the first battery is warranted. Responsive to determining that replacement of the first battery is warranted, the method sends an electronic order to a supplier for a replacement battery for the first smart-home device. The method further includes reading, by one or more of the smart-home devices, a machine readable code that accompanies a shipment of the replacement battery, the code embodying information from which a particular identity of the first smart-home device can be determined; determining, based at least in part on the information embodied in the code, a location of the first smart-home device within the home; and providing, by one or more of the smart-home devices, visual and/or audible information to a user that guides the user to said location of the first smart-home device. In another embodiment, a tangible, non-transitory, computer-readable storage medium has instructions stored thereon that, when executed by one or more processors, cause the one or more processors to perform the steps of the method.

In another embodiment, a smart-home system recognizes and facilitates replacement of batteries in devices in a home. The system includes a plurality of smart-home devices configured for wireless communication with one another, the plurality of smart-home devices including one or more battery operated devices. At least one of the plurality of smart-home devices measures a battery characteristic representative of a condition of a first battery, while the first battery is in operation within a first device of the one or more battery operated devices. At least one of the plurality of smart-home devices determines, from the battery characteristic, whether replacement of the first battery is warranted. Responsive to determining that replacement of the first battery is warranted, at least one of the plurality of smart-home devices sends an electronic order to a supplier for a replacement battery for the first smart-home device. One of the plurality of smart-home devices reads a machine readable code that is received in a shipment of the replacement battery, the code embodying information from which a particular identity of the first smart-home device can be determined. One of the plurality of smart-home devices determines, based at least in part on the information embodied in the code, a location of the first smart-home device within the home. One or more of the plurality of smart-home devices provides visual and/or audible information to a user that guides the user to said location of the first smart-home device.

Further areas of applicability of the present disclosure will become apparent from the detailed description provided hereinafter. It should be understood that the detailed description and specific examples, while indicating various embodiments, are intended for purposes of illustration only and are not intended to limit the scope of the disclosure.

Figure 1:
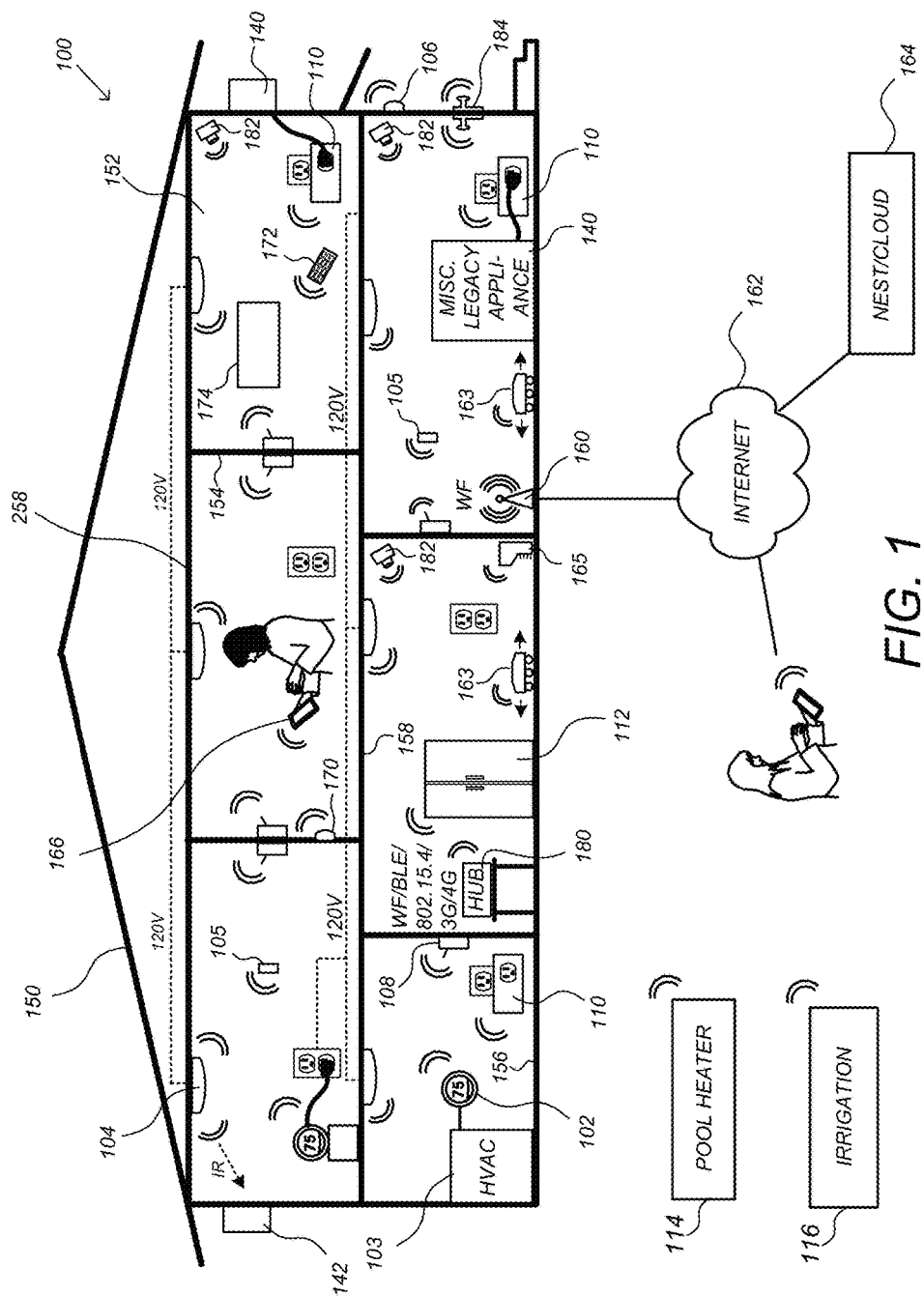
FIG. 1 schematically illustrates an example of a smart-home environment that includes devices and systems using power from batteries, in accord with an embodiment.

In the appended drawings, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label. It is noted that, for purposes of illustrative clarity, certain elements in the drawings may not be drawn to scale. In instances where multiple instances of an item are shown, only some of the instances may be labeled, for clarity of illustration.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION

Methods that help users anticipate battery replacement needs, or facilitate ordering and replacement at appropriate times, would be useful. The increased burden of numerous devices continually requiring replacement battery re-ordering may lead to poor user experience, and associated poor perception of a device or platform of devices that require unplanned intervention. There are online shopping/e-commerce websites that provide subscription services for regularly consumed household or workplace items. But the triggering event(s) are not always tied to actual need, but rather a predetermined interval that may diverge from real-world usage or need. Arrival of items provided by such services may lead to poor user experience in the sense that such items may need to be stored because they are not presently needed. Also, some items that are normally hidden while in use (e.g., certain batteries) may be unfamiliar to the user, who may be left wondering what the items are intended for.

FIG. 1 schematically illustrates an example of a smart-home environment 100 that includes devices and systems using power from batteries that may be replenished as described further herein. Although the term "smart-home environment" is used throughout the present disclosure, it will be appreciated that this term is not limited to residential "homes" but includes any type of location such as single family or multi-unit residences, outbuildings, businesses, stores, factories, warehouses, restaurants, entertainment venues, and so forth. Also, the term "smart-home system" is utilized interchangeably with "smart-home environment" herein, it being understood that smart devices that communicate with one another to share information and act on the information that is shared, form a system. The depicted smart-home environment 100 includes a structure 150, which can include, e.g., a house, garage, mobile home, office building or other business. It will also be appreciated that devices can also be integrated into a smart-home environment 100 that does not include an entire structure 150, but only a portion thereof, such as single apartments, condominiums, or offices, or sections or blocks thereof. Further, the smart home environment can control and/or be coupled to devices outside of the actual structure 150. Indeed, several devices in the smart home environment need not physically be within structure 150 at all. For example, a pool heater, an irrigation system and/or other devices or equipment can be located outside of the structure 150.

The depicted structure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor 156 or ceiling 158.

In some embodiments, smart-home system 100 of FIG. 1 includes a plurality of devices, including intelligent, multi-sensing, network-connected devices, that can integrate seamlessly with each other and/or with a central server or a cloud-computing system to provide any of a variety of useful smart-home objectives. Smart-home system 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), and one or more intelligent, multi-sensing, network-connected entryway interface devices 106 (hereinafter referred to as "smart doorbells 106"). According to embodiments, smart thermostat 102 detects ambient climate characteristics (e.g., temperature and/or humidity) and controls a HVAC system 103 accordingly. Smart hazard detector 104 may detect the presence of a hazardous substance or a substance indicative of a hazardous substance (e.g., smoke, fire, carbon monoxide or other chemical). Smart doorbell 106 may detect a person's approach to or departure from a location (e.g., an outer door), control doorbell functionality, announce a person's approach or departure via audio or visual means, or control settings on a security system (e.g., to activate or deactivate the security system when occupant go and come). Other aspects of smart-home environments are disclosed in U.S. patent application Ser. No. 13/835,439, filed 15 Mar. 2013, which is hereby incorporated by reference in its entirety.

In some embodiments, smart-home system 100 of FIG. 1 further includes one or more intelligent, multi-sensing, network-connected wall switches 108, along with one or more intelligent, multi-sensing, network-connected wall plug interfaces 110 (hereinafter referred to as "smart wall plugs 110").

Still further, in some embodiments, smart-home system 100 of FIG. 1 includes a plurality of intelligent, multi-sensing, network-connected appliances 112 (hereinafter referred to as "smart appliances 112"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, network-connected appliances 112 are made compatible with smart-home environment 100 by cooperating with the respective manufacturers of the appliances. For example, smart appliances 112 can be space heaters, window AC units, motorized duct vents, etc. When plugged in, a smart appliance 112 can announce itself to smart-home network 100, such as by indicating what type of appliance it is, and it can automatically integrate with the controls of the smart-home. Such communication by the appliance to the smart home can be facilitated by any wired or wireless communication protocols known by those having ordinary skill in the art. Smart-home environment 100 can also include a variety of non-communicating legacy appliances 140, such as conventional washer/dryers, refrigerators, air conditioners and the like which can be controlled, albeit coarsely (ON/OFF), by virtue of the smart wall plugs 110.

The smart-home environment 100 can further include a variety of partially communicating legacy appliances 142, such as infrared ("IR") controlled wall air conditioners or other IR-controlled devices, which can be controlled by IR signals provided by the smart hazard detectors 104 or the smart wall switches 108.

According to embodiments, smart thermostats 102, smart hazard detectors 104, smart doorbells 106, smart wall switches 108, smart wall plugs 110, and other devices of the smart-home environment 100 are modular and can be incorporated into older and new houses. For example, the devices may be designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

Smart devices that are portable and are not typically associated with facilities of a smart-home system per se may also be associated with, utilized in, and become integrated with, the smart-home environment. One example discussed below is that of a network-connected computer or portable electronic device (typically, but without limitation, a tablet or smartphone) 166. Devices like tablet or smartphone 166 that can provide a graphical user interface ("GUI") to enable complex interactions such as displaying and navigating among options, entering information from buttons, keys, pointing devices (e.g., a mouse), touch-screen equivalents and the like can function as smart-home controllers. Other examples of smart devices, including without limitation portable radios, music and/or video players, toys, tools, portable kitchen appliances, e-readers and the like, are more likely to be single-use devices than smart-home controllers. Any of these devices that can successfully communicate within the smart-home environment may participate in the battery replenishment systems and methods disclosed herein.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly-capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a backroom or basement, etc. According to embodiments, locations within a smart-home system 100 can be given names that make sense to a user, and these names can be stored by devices within environment 100 for future reference. For example, when first plugged into a docking station, a head unit can ask the user (by 2D LCD display, 2D/3D holographic projection, voice interaction, etc.) a few simple questions such as, "Where am I" and the user can indicate "living room", "kitchen" and so forth. The head unit can store the information for use in future interactions with the user.

Smart-home environment 100 may also include communication with devices outside walls of the environment but within a proximate geographical range of the environment. For example, smart-home environment 100 may include a pool heater monitor 114 that communicates a current pool temperature to other devices within the smart-home environment 100 or receives commands for controlling the pool temperature. Similarly, the smart-home environment 100 may include an irrigation monitor 116 that communicates information regarding irrigation systems within smart-home environment 100 and/or receives control information for controlling such irrigation systems.

By virtue of network connectivity, one or more of the smart-home devices of FIG. 1 can further allow a user to interact with the device even if the user is not proximate to the device. For example, a user can communicate with a device using a network-connected computer (e.g., a desktop computer) or portable electronic device (e.g., a laptop computer, or tablet, or smartphone) 166. A webpage that is accessed through the Internet, or an application ("app") that is installed and runs locally, can be configured to receive communications from the user and control the device based on the communications and/or to present information about the device's operation to the user, while the user is in the structure or outside the structure.

As discussed, users can control the smart thermostat and other smart devices in smart-home system 100 using network-connected computer or portable electronic device (e.g., smart-home controller) 166. In some examples, some or all of the occupants (e.g., individuals who live in the home) can register one or more smart-home controllers 166 with smart-home environment 100. Such registration can be made at a central server to authenticate the occupant and/or the device as being associated with the home, and to give permission to the occupant to use the device to control the smart devices in the home. An occupant can use their smart-home controller 166 to remotely control the smart devices of smart-home system 100, such as when the occupant is at work or on vacation. The occupant may also use their registered device to control the smart devices when the occupant is actually located inside smart-home environment 100, such as when the occupant sits on a couch inside the home. It should be appreciated that instead of or in addition to registering devices 166, smart-home environment 100 makes inferences about which individuals live in the home and are therefore occupants, and which smart-home controllers 166 are associated with those individuals. As such, the smart-home system infers or "learns" who is an occupant and permits the devices 166 associated with those individuals to control the smart devices of smart-home environment 100.

According to embodiments, a guest-layer of controls can be provided to guests of smart-home environment 100. The guest-layer of controls gives guests access to basic controls (e.g., a selected subset of features of the smart devices), such as temperature adjustments, but it locks out other functionalities. The guest layer of controls can be thought of as a "safe sandbox" in which guests have limited controls, but without access to more advanced controls that could fundamentally alter, undermine, damage, or otherwise impair the occupant-desired operation of the smart devices. For example, a guest layer of controls may not permit the guest to adjust a heat-pump lockout temperature.

According to some embodiments, a smart television remote control 172 for a television 174 is provided. Smart remote control 172 may recognize occupants by one or more of thumbprint, visual identification, RFID, etc., and may recognize users as guests or as someone belonging to a particular class having limited control and access (e.g., a child). Upon recognizing the user as a guest or someone belonging to a limited class, smart remote control 172 only permits that user to view a subset of channels and to make limited adjustments to the settings of the television and other devices. For example, a guest cannot adjust digital video recorder (DVR) settings, and a child is limited to viewing child-appropriate programming.

According to certain embodiments, a smart camera 182 is provided. Smart camera 182 may, for example, wirelessly transmit still images and/or video to smart-home environment 100. Smart camera 182 may be equipped with a real-time clock and may provide date/time stamps on the images and/or video. According to certain embodiments, a smart door lock 184 is provided. Smart door lock 184 may receive signals from smart-home environment 100 to provide intelligent security functions, such as for example automatically opening when a known and trusted user or occupant approaches, but remaining locked when an unknown or blacklisted person approaches. Smart door lock 184 may also include sensors and wireless transmitting ability to provide information such as, but not limited to, when its associated door is opened or closed, or activity that would suggest tampering.

In some embodiments, in addition to containing processing and sensing capabilities, each of devices 102, 104, 106, 108, 110, 112, 114, 116, 172 and 174 (collectively referred to as "the smart devices") is capable of data communications and information sharing with any other of the smart devices, as well as to any central server or cloud-computing system or any other device that is network-connected anywhere in the world. The required data communications can be carried out using any of a variety of custom or standard wireless protocols such as: IEEE 802.11 based communication ("WiFi"); Bluetooth Low Energy ("BLE"); 3G/4G wireless; low power, IEEE 802.15.4 based protocols, such as Zigbee and 6LoWPAN, etc.; and/or any of a variety of custom or standard wired protocols (CAT6 Ethernet, HomePlug, etc.).

According to embodiments, all or some of the smart devices can serve as wireless or wired repeaters. For example, a first one of the smart devices can communicate with a second one of the smart device via a wireless router 160. The smart devices can further communicate with each other via a connection to a local hub 180, and/or to a network, such as the Internet 162. Hub 180 may communicate wirelessly, for example, with any or all smart devices of smart-home environment 100. In embodiments, hub 180 may support any or all of WiFi, BLE, 3G/4G wireless, CAT6 Ethernet, HomePlug, Zigbee and/or 6LoWPAN. U.S. patent application Ser. Nos. 13/926,312 and 13/656,189 are incorporated by reference and provide further information on certain IEEE 802.15.4 and IEEE 802.11 based protocols respectively. Hub 180 may gather, store and/or analyze data from all smart devices of smart-home system 100. Through hub 180 or independently, the smart devices can communicate to Internet 162 to reach a central server or a cloud-computing system 164. The central server or cloud-computing system 164 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from the central server or cloud-computing system 164 to devices (e.g., when available, when purchased, or at routine intervals).

According to embodiments, the smart devices combine to create a mesh network of spokesman and low-power nodes in the smart-home environment 100, where some of the smart devices are "spokesman" nodes and others are "low-powered" nodes. Some of the smart devices in the smart-home environment 100 are battery powered, while others have a regular and reliable power source, such as by connecting to wiring (e.g., to 120V line voltage wires) behind the walls 154 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home system 100 as well as with the central server or cloud-computing system 164. On the other hand, the devices that are battery powered are referred to as "low-power" nodes. These nodes tend to be smaller than spokesman nodes and can only communicate using wireless protocol that requires very little power, such as Zigbee, 6LoWPAN, BLE, etc. Further, some, but not all, low-power nodes are incapable of bidirectional communication. These low-power nodes send messages, but they are unable to "listen". Thus, other devices in the smart-home environment 100, such as the spokesman nodes, cannot send information to these low-power nodes.

As described, some or all of the smart devices in smart-home environment 100 serve as low-power and spokesman nodes to create a mesh network. Individual low-power nodes in smart-home environment 100 regularly send out messages regarding what they are sensing, and the other low-powered nodes in smart-home system 100—in addition to sending out their own messages—repeat the messages, thereby causing the messages to travel from node to node (i.e., device to device) throughout smart-home system 100. The spokesman nodes in smart-home environment 100 are able to "drop down" to low-powered communication protocols to receive these messages, translate the messages to other communication protocols, and send the translated messages to other spokesman nodes and/or the central server or cloud-computing system 164. Thus, the low-powered nodes using low-power communication protocols are able send messages across the entire smart-home environment 100 as well as over the Internet 162 to the central server or cloud-computing system 164. According to embodiments, the mesh network enables the central server or cloud-computing system 164 to regularly receive data from all of the smart devices in smart-home environment 100, make inferences based on the data, and send commands back to individual ones of the smart devices to accomplish some of the smart-home objectives described herein.

As described, the spokesman nodes and some of the low-powered nodes are capable of "listening". Accordingly, users, other devices, and central server or cloud-computing system 164 can communicate controls to the low-powered nodes. For example, a user can use a smart-home controller (e.g., a smartphone) 166 to send commands over Internet 162 to central server or cloud-computing system 164, which then relays the commands to the spokesman nodes in smart-home environment 100. The spokesman nodes drop down to a low-power protocol to communicate the commands to the low-power nodes throughout the smart-home system, as well as to other spokesman nodes that did not receive the commands directly from the central server or cloud-computing system 164.

An example of a low-power node is a smart nightlight 170. In addition to housing a light source, smart nightlight 170 houses an occupancy sensor, such as an ultrasonic or passive IR sensor, and an ambient light sensor, such as a photoresistor or a single-pixel sensor that measures light in the room. In some embodiments, smart nightlight 170 is configured to activate the light source when its ambient light sensor detects that the room is dark and when its occupancy sensor detects that someone is in the room. In other embodiments, smart nightlight 170 is simply configured to activate the light source when its ambient light sensor detects that the room is dark. Further, according to embodiments, smart nightlight 170 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within smart-home environment 100 as well as over Internet 162 to central server or cloud-computing system 164.

Other examples of low-powered nodes include battery-operated versions of smart hazard detectors 104, and universal sensors 105. Smart hazard detectors 104 are often located in an area without access to constant and reliable power and, as discussed in detail below, may include any number and type of sensors, such as smoke/fire/heat sensors, carbon monoxide/dioxide sensors, volatile organic compound sensors, humidity sensors, occupancy/motion sensors, ambient light sensors, temperature sensors, humidity sensors, and the like. Universal sensors 105 are for general information gathering about smart-home system 100, including information that may be utilized to infer occupancy patterns. Universal sensors 105 may be battery operated, may also include smoke/fire/heat sensors, carbon monoxide/dioxide sensors, volatile organic compound sensors, humidity sensors, occupancy/motion sensors, ambient light sensors, temperature sensors, humidity sensors, and the like, and may further include sensors such as microphones, infrared signal sensors, accelerometers and magnetometers. Smart hazard detectors 104 and universal sensors 105 can send messages that correspond to each of the respective sensors to the other devices and the central server or cloud-computing system 164, such as by using the mesh network described above. Universal sensors 105 may simply gather and transmit data to other smart-home devices for processing, or may perform processing themselves, for example analyzing gathered data to establish patterns of occupancy, patterns associated with individual residents or occupants, and so forth.

Examples of spokesman nodes include smart doorbells 106, smart thermostats 102, smart wall switches 108, and smart wall plugs 110. Devices 102, 106, 108, and 110 are often located near and connected to a reliable power source, and therefore can include more power-consuming components, such as one or more communication chips capable of bidirectional communication in any variety of protocols.

In some embodiments, these low-powered and spokesman nodes (e.g., devices 102, 104, 105, 106, 108, 110, 112, and 170) can function as "tripwires" for an alarm system in smart-home system 100. For example, in the event a perpetrator circumvents detection by alarm sensors located at windows, doors, and other entry points of smart-home environment 100, an alarm could be triggered upon receiving an occupancy, motion, heat, sound, etc. message from one or more of the low-powered and spokesman nodes in the mesh network. For example, upon receiving a message from a smart nightlight 170 indicating the presence of a person, the central server or cloud-computing system 164 or some other device could trigger an alarm. Thus, the alarm functionality could be enhanced by various low-powered and spokesman nodes located throughout smart-home environment 100. In this example, a user could enhance the security of smart-home environment 100 by deploying multiples of any of devices 102, 104, 105, 106, 108, 110, 112, and 170.

In some embodiments, the mesh network can be used to implement a user tracking functionality. User tracking may be utilized to automatically turn lights on and off, or provide other functionality, as a person transitions from place to place and/or from room to room. For example, low-powered and spokesman nodes (e.g., devices 102, 104, 105, 106, 108, 110, 112, and 170) may detect the person's movement through smart-home environment 100 and communicate corresponding messages through the mesh network. Using the messages that indicate which locations and/or rooms are occupied, the central server or cloud-computing system 164, or one or more other devices within smart-home environment 100, activate and deactivate smart wall switches 108 to automatically provide light as the person moves from room to room in the smart-home environment 100. Further, users may provide pre-configuration information that indicates which smart wall plugs 110 provide power to lamps and other light sources, such as the smart nightlight 170. Alternatively, mapping of light sources to wall plugs 110 can be done automatically (e.g., smart wall plugs 110 detect when a light source is plugged into it, and send corresponding messages to central server or cloud-computing system 164). Using this mapping information in combination with messages that indicate which rooms are occupied, central server or cloud-computing system 164 or one or more other devices activate and deactivate smart wall plugs 110 that provide power to lamps and other light sources, so as to track the person's movement and provide light as the person moves from room to room.

User tracking functionality is not limited to providing artificial light, but may also be utilized to tailor environmental settings such as heating, cooling, and operation of window coverings so as to admit daylight for light and/or heat, or exclude daylight to reduce cooling needs. User tracking functionality may also be utilized to guide a user to a specific location, as disclosed further below.

In some embodiments, the mesh network of low-powered and spokesman nodes can be used to provide route navigation aids, such as exit lighting in the event of an emergency, or to guide the user to a specific location. In some instances, to facilitate this, users may provide pre-configuration information that indicates exit routes in the smart-home system 100. For example, for each room in the house, the user may provide a map of the best exit route. Alternatively, instead of a user providing this information, the central server or cloud-computing system 164 or some other device could the automatically determine the routes using uploaded maps, diagrams, architectural drawings of the smart-home house, as well as using a map generated based on positional information obtained from the nodes of the mesh network (e.g., positional information from the devices is used to construct a map of the house). In an example of operation, when an alarm is activated (e.g., when one or more of the smart hazard detector 104 detects smoke and activates an alarm), the central server or cloud-computing system 164, or some other device, uses occupancy information obtained from the low-powered and spokesman nodes to determine which rooms are occupied and then turns on lights (e.g., using smart nightlights 170, smart wall switches 108, smart wall plugs 110 that power lamps, etc.) along the exit routes from the occupied rooms so as to provide emergency exit lighting. In another example of operation, the central server or cloud-computing system 164, or some other device, determines a direction from the user's position to a desired location, and provides audio cues to the user indicating the direction.

Further included and illustrated in the exemplary smart-home environment 100 of FIG. 1 are service robots 163 each configured to carry out, in an autonomous manner, any of a variety of household tasks. For some embodiments, the service robots 163 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 163 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

Technologies by which the localized-thermostat service robot 163 (and/or the larger smart-home system of FIG. 1) can identify and locate a user can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone). Rules-based inference engines or artificial intelligence techniques may also draw useful conclusions from sensed information (e.g., if there is only a single occupant present in the home, then that is the person whose immediate space should be kept at a comfortable temperature).

The above-described "human-facing" and "away" functionalities can be provided, without limitation, by multiple distinct service robots 163 having respective dedicated ones of such functionalities, by a single service robot 163 having an integration of two or more different ones of such functionalities, and/or any combinations thereof (including the ability for a single service robot 163 to have both "away" and "human facing" functionalities) without departing from the scope of the present teachings. Electrical power can be provided by virtue of rechargeable batteries or other rechargeable methods, with FIG. 1 illustrating an exemplary out-of-the-way docking station 165 to which the service robots 163 will automatically dock and recharge its batteries (if needed) during periods of inactivity. Preferably, each service robot 163 includes wireless communication components that facilitate data communications with one or more of the other wirelessly communicating smart-home sensors of FIG. 1 and/or with one or more other service robots 163 (e.g., using Wi-Fi, Zigbee, Z-Wave, 6LoWPAN, BLE, etc.), and one or more of the smart-home devices of FIG. 1 can be in communication with a remote server over the Internet. Alternatively or in conjunction therewith, each service robot 163 can be configured to communicate directly with a remote server by virtue of cellular telephone communications, satellite communications, 3G/4G network data communications, or other direct communication method.

According to embodiments, central server or cloud-computing system 164 can make inferences about individual users, and may be able to discern among the users. For example, individual occupants may be identified based on their "unique signature", which is determined based on data obtained from sensors located in the smart devices. For example, the sensors include ultrasonic sensors, passive IR sensors, and the like. The unique signature is based on a combination of walking gait, patterns of movement, voice, height, size, etc. Such data may include an occupant's breathing patterns, heart rate, movement, etc. It should be appreciated that facial recognition may also be used.

Figure 2:
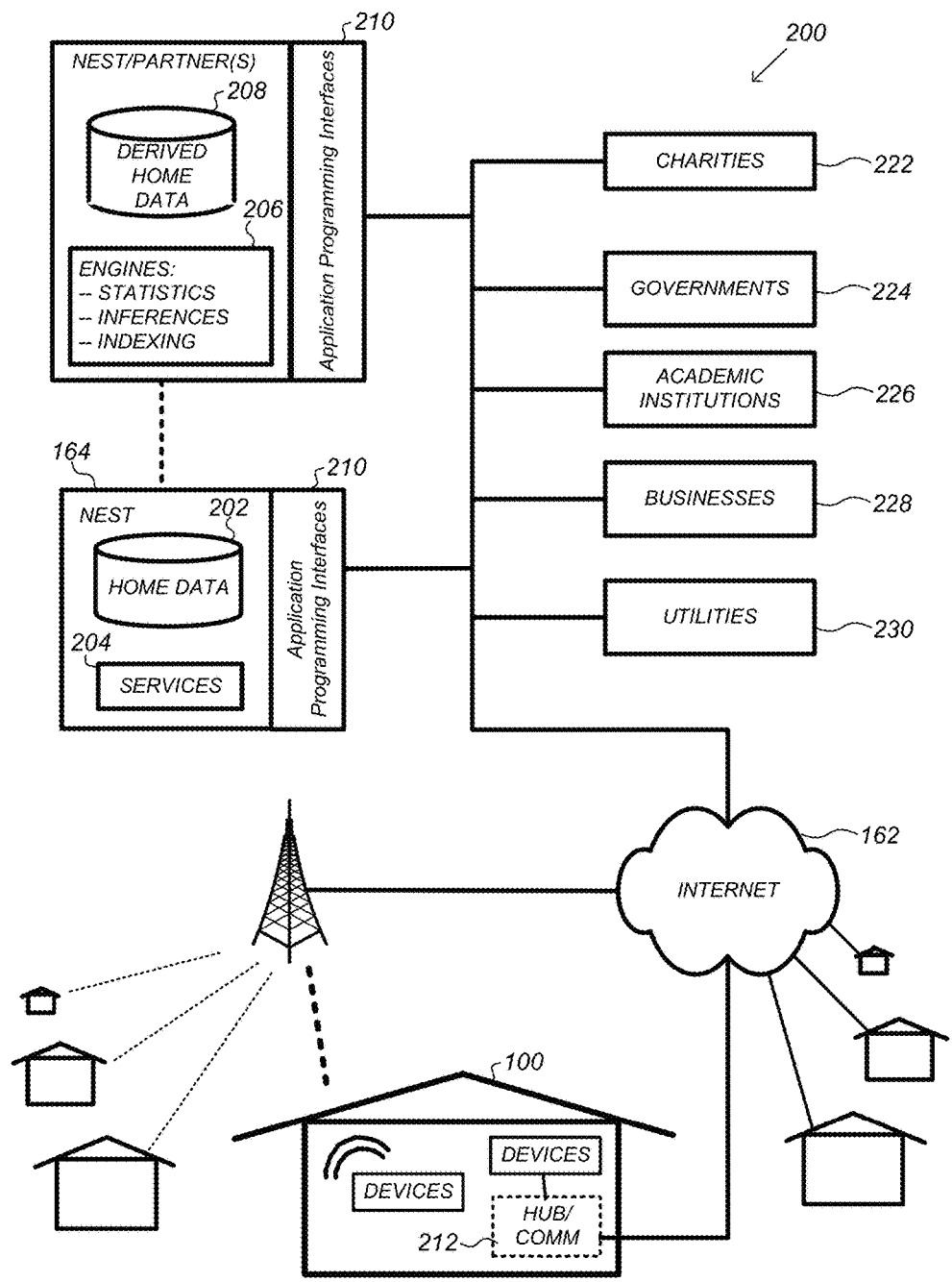
FIG. 2 schematically illustrates a network-level view of an extensible devices and services platform with which a plurality of smart-home environments, such as the smart-home environment of FIG. 1, can be integrated, in accord with an embodiment.

FIG. 2 schematically illustrates a network-level view of an extensible devices and services platform 200 with which a plurality of smart-home environments, such as smart-home environment 100 of FIG. 1, can be integrated. The extensible devices and services platform 200 includes remote servers or cloud computing system 164. Each of the intelligent, network-connected devices 102, 104, 105, 106, 108, 110, 112, 114, 116, 160, 163, 165, 170, 172, 174 and 180 from FIG. 1 (identified simply as "smart devices" in FIGS. 2-3 herein) can communicate with the remote servers or cloud computing system 164. For example, a connection to Internet 162 can be established either directly (for example, using 3G/4G connectivity to a wireless carrier), through a network hub 212 (which can be a device ranging in capabilities from a simple wireless router, for example, up to and including an intelligent, dedicated whole-home control node), or through any combination thereof.

Although in some examples provided herein, devices and services platform 200 communicates with and collects data from smart devices of smart-home environment 100 of FIG. 1, it should be appreciated that devices and services platform 200 communicates with and collects data from a plurality of smart-home environments across the world. For example, central server or cloud-computing system 164 can collect home data 202 from the devices of one or more smart-home environments, where the devices can routinely transmit home data or can transmit home data in specific instances (e.g., when a device queries the home data 202). Thus, the devices and services platform 200 routinely collects data from homes across the world. As described, the collected home data 202 includes, for example, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, etc.

Central server or cloud-computing system 164 can further provide one or more services 204. The services 204 can include, e.g., software updates, customer support, sensor data collection/logging, remote access, remote or distributed control, or use suggestions (e.g., based on collected home data 202 to improve performance, reduce utility cost, etc.). Data associated with the services 204 can be stored at the central server or cloud-computing system 164 and the central server or the cloud-computing system 164 can retrieve and transmit the data at an appropriate time (e.g., at regular intervals, upon receiving request from a user, etc.).

As illustrated in FIG. 2, an embodiment of the extensible devices and services platform 200 includes a processing engine 206, which can be concentrated at a single server or distributed among several different computing entities without limitation.

In some embodiments, to encourage innovation and research and to increase products and services available to users, the devices and services platform 200 exposes a range of application programming interfaces (APIs) 210 to third parties, such as charities 222, governmental entities 224 (e.g., the Food and Drug Administration or the Environmental Protection Agency), academic institutions 226 (e.g., university researchers), businesses 228 (e.g., providing device warranties or service to related equipment, targeting advertisements based on home data), utility companies 230, and other third parties. The APIs 210 are coupled to and permit third-party systems to communicate with the central server or the cloud-computing system 164, including the services 204, the processing engine 206, the home data 202, and the derived home data 208. For example, the APIs 210 allow applications executed by the third parties to initiate specific data processing tasks that are executed by the central server or the cloud-computing system 164, as well as to receive dynamic updates to the home data 202 and the derived home data 208.

In one example, a shipping company creates an app that makes inferences regarding when people are at home. The app uses the inferences to schedule deliveries for times when people will most likely be at home. The app can also build delivery routes around these scheduled times. This reduces the number of instances where the shipping company has to make multiple attempts to deliver packages, and it reduces the number of time consumers have to pick up their packages from the shipping company.

Figure 3:
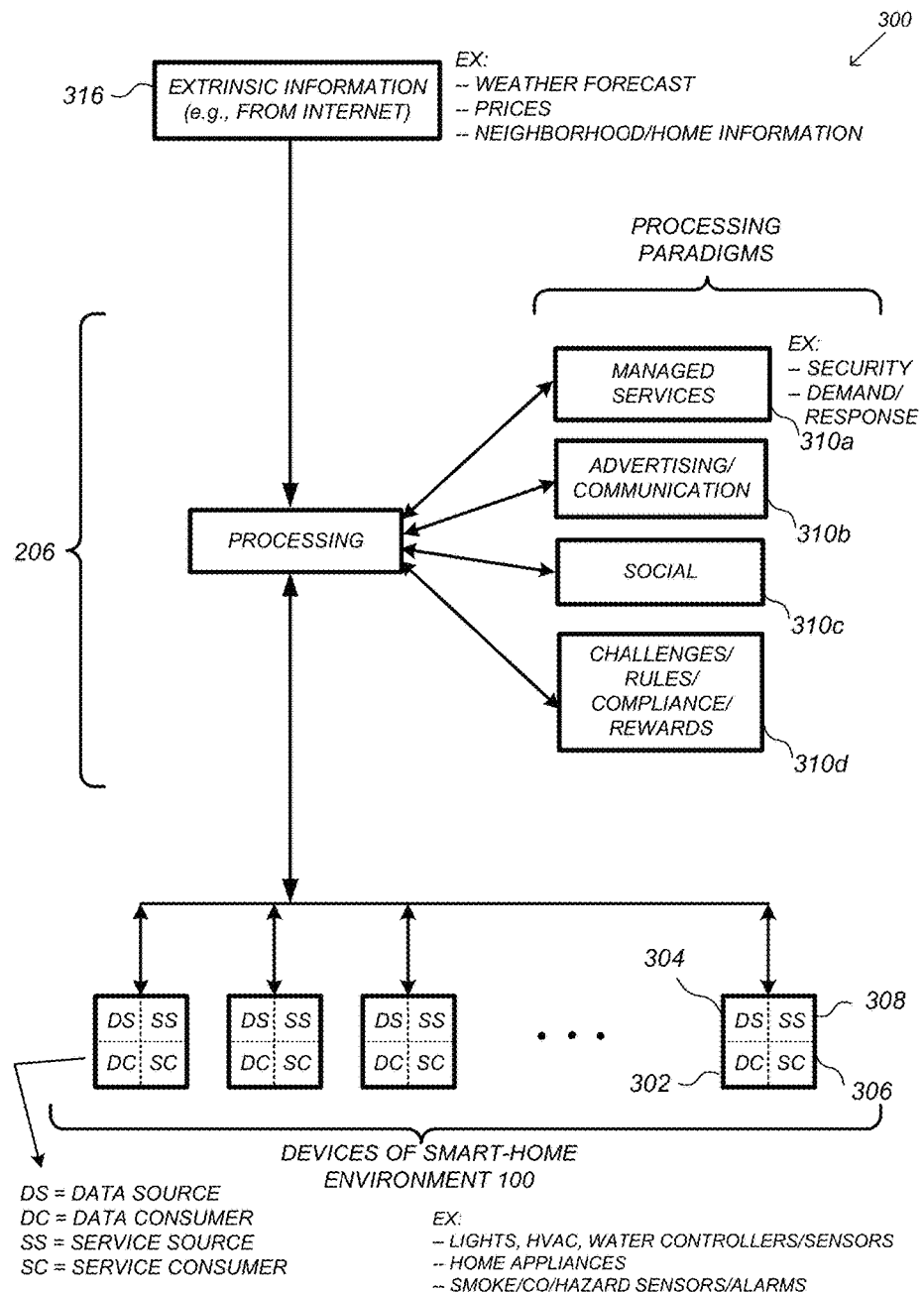
FIG. 3 schematically illustrates an abstracted functional view of the extensible devices and services platform of FIG. 2, in accord with an embodiment.

FIG. 3 schematically illustrates an abstracted functional view of the extensible devices and services platform 200 of FIG. 2, with particular reference to the processing engine 206 as well as devices, such as those of the smart-home system 100 of FIG. 1. Even though devices situated in smart-home environments will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform 200 can also be configured to harness the large amount of data that is flowing out of these devices. In addition to enhancing or optimizing the actual operation of the devices themselves with respect to their immediate functions, the extensible devices and services platform 200 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

In smart-home environment 100, various devices that are connected to the Internet and utilize a battery, measure and/or track their own battery charge levels, can determine the battery's remaining expected useful life, and have reporting and/or battery ordering functions that operate through the Internet. Such devices may include, for example, smart thermostats 102, smart hazard detectors 104, smart doorbells 106, smart wall switches 108, smart wall plugs 110, battery operated media devices (e.g., smart-home controller 166), and any of smart appliances 112 such as refrigerators, stoves and/or ovens, televisions, washers, dryers, lights, stereos, intercom systems, garage-door openers, floor fans, ceiling fans, wall air conditioners, pool heaters and chemical management systems, irrigation systems, security systems, and so forth, as well as remote control devices for any of these devices.

Figure 4:
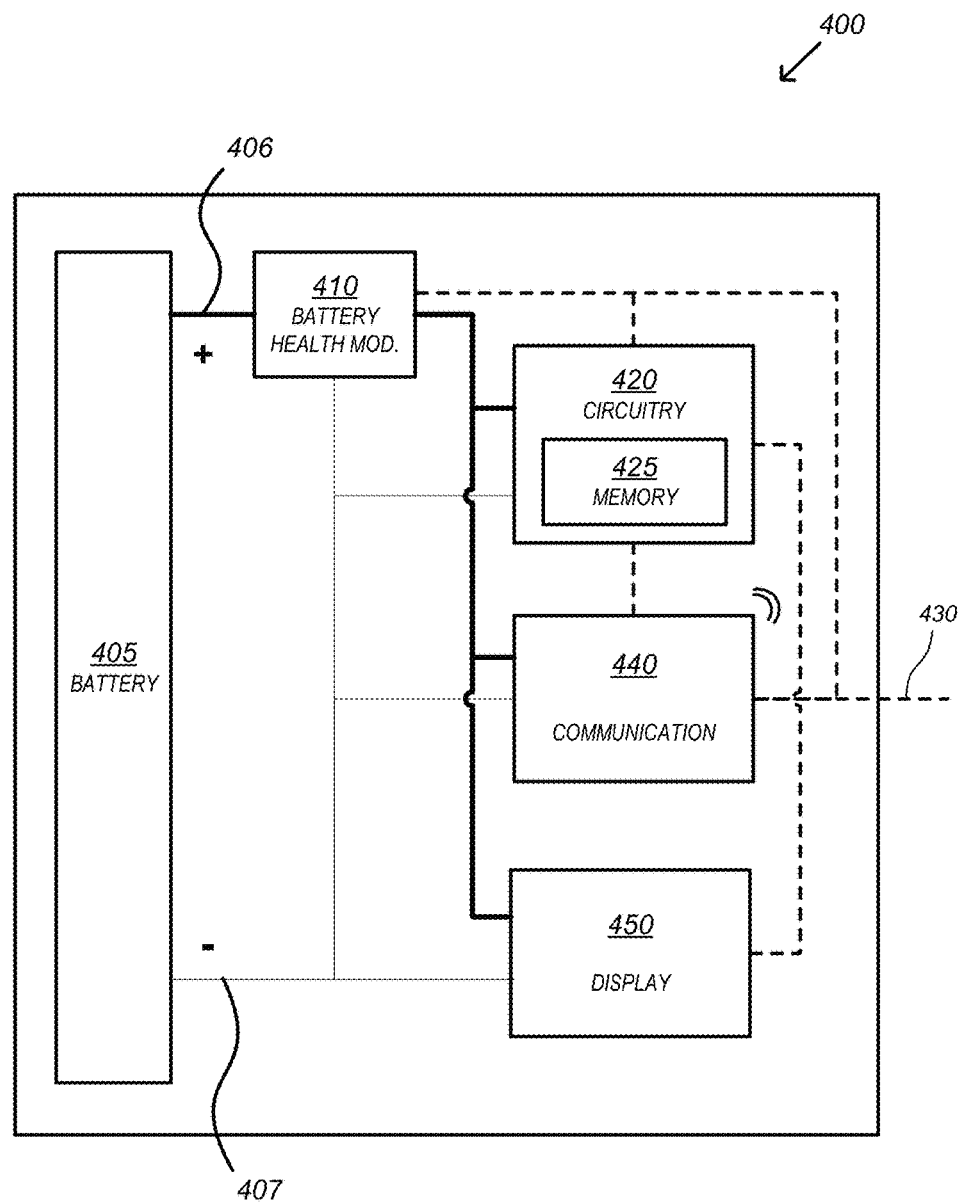
FIG. 4 schematically illustrates certain components of one or more of the smart devices of FIGS. 1, 2 and/or 3, in accord with an embodiment.

FIG. 4 schematically illustrates certain components of a smart device 400 that could be, for example, one or more of the smart devices of FIGS. 1, 2 and/or 3. In FIG. 4, power and ground connections are shown in solid lines while data connections are shown in broken lines. Smart device 400 operates using electrical power from battery 405 and shares data with other smart devices through wired or wireless communication means 440; an external connection 430 is shown, which may include fixed wiring or may be an externally facing data port of smart device 400. A positive terminal 406 of battery 405 is designated by a plus sign, and connections thereto are shown in heavy lines, while a negative terminal 407 of battery 405 is designated by a minus sign, with connections thereto shown in light lines. Power from battery 405 is also supplied to circuitry 420 that provides user functionality of smart device 400, that is, circuitry 420 represents functionality of the thermostat, hazard detector, appliance, remote control or the like that is provided by smart device 400. Circuitry 420 may include one or more custom processors, general purpose processors configured with custom software, and/or discrete logic to provide the functionality of the smart device. Circuitry 420 may include optional memory 425 for holding software, data and/or instructions generated by, or transmitted to or from, smart device 400. Smart device 400 may also include one or more optional display features 450 such as, for example, light and/or sound generating features. Data may be exchanged among any of an optional battery health module 410, circuitry 420, communication means 440 and/or display 450.

Battery 405's remaining useful life may be estimated by battery health module 410 that measures battery characteristics. For example, optional battery health module 410 may measure battery voltage, and/or current that is passed when a load is applied. In embodiments, while smart device 400 operates, battery health module 410 may measure current drawn in actual use, or during periods of non-use, battery health module 410 may momentarily switch in a test load and measure current drawn through the load. In some embodiments, battery health module 410 simply measures characteristics of battery 405 and sends data thereof to circuitry 420 and/or communication means 440. Battery characteristic data need not be evaluated in real time to determine battery life, but may instead be stored in memory 425 or by another device that receives the data for later evaluation. In other embodiments, battery health module 410 determines estimated remaining useful life. In some cases battery health module 410 and/or other smart devices determine the estimated remaining useful battery life by measured battery characteristics alone; in other cases, estimated remaining useful life is determined by monitoring typical device usage and extrapolating useful life based on a combination of battery characteristics and the typical usage. When remaining useful life is estimated based on typical usage, a correction factor may be applied to account for future usage being more than typical, to provide a conservative remaining useful life estimate.

As noted above, battery health module 410 may measure all of the current provided by battery 405. For example module 410 may monitor voltage across a small value resistor that is connected in series with positive terminal 406. For this reason, positive connections to circuitry 420 and communication means 440 are shown as being made to a heavy line connected to battery health module 410 (e.g., on an end of the small value resistor whose opposite end is connected with positive terminal 406). However, this arrangement is optional and exemplary only; other embodiments may simply monitor voltage across the terminals of battery 405, in which case power connections of circuitry 420 and communication means 440 would be made directly to terminal 406 of battery 405.

In still other embodiments, smart device 400 does not include battery health module 410; instead, other devices of a smart-home system may determine a battery characteristic or estimate remaining useful battery life by evaluating signals from smart device 400 in normal operation. That is, when communication means 440 sends a (wireless or wired) signal from smart device 400 to another smart device, the other smart device may evaluate the signal, determine that the signal is weak and determine from the weak signal that battery 405 is depleted. Factory-supplied specifications of signal strength vs. battery level, or empirically derived relationships of signal strength with battery lifetime for the same or similar devices, may be utilized to infer battery characteristics and/or estimate remaining useful life of battery 405 within smart device 400.

Smart device 400, as well as other smart devices of smart-home system 100, can participate in tasks such as determining user occupancy and usage patterns, applying knowledge of such patterns in extrapolating useful life of battery 405, notifying a user that a battery replacement is needed, placing an order for an appropriate replacement battery, and assisting with location of smart device 400 and replacement of battery 405. Functionality of measuring battery characteristics, estimating remaining useful battery life, alerting a user of smart device 400, and ordering batteries may be implemented through apps or websites that are accessible to the user through smart device 400 (e.g., apps or websites that run on circuitry 420 and interact with a user through a graphical user interface ("GUI") utilizing display 450) or through other smart devices. That is, in some cases the app and/or website runs on the battery operated device itself; in other cases the device connects with and provides at least battery state information to a host device that runs the app and/or website. The host device could be any convenient device capable of user interaction and Internet access, such as a home computer, mobile phone, tablet or custom device that can receive the battery state information wirelessly or through a wired connection with connection means 440.

In certain embodiments, a host device aggregates data from one or more battery operated smart devices, and uploads the aggregated data to another smart device that runs the apps and/or websites. The host device or other smart device may, in embodiments, track battery state over time, perform calculations, store and/or display data associated with device usage and/or battery states. Also, in certain embodiments, one or more of the smart devices can provide multiple stage alerts, such as an early warning (e.g., battery life estimated as less than two months) as well as a critical warning (e.g., battery life estimated as less than two weeks, two days, two hours etc.).

When a replacement battery arrives, the same or different one or more smart devices can notify a user that the replacement battery was received, identify the unit for which the replacement battery was ordered, and assist with battery replacement. Most of these tasks are not tied to a particular smart device; that is, communication among the smart devices of smart-home environment 100 may enable many different devices to participate in the methods discussed below.

For example, smart device 400 may generate its own usage data, and may send, receive and/or combine its own usage data with that of other devices in smart-home environment 100, to estimate usage of smart device 400 going forward. The usage information can be combined with battery characteristics measured by module 410, either by smart device 400 or a different smart device, to provide a remaining useful life estimate. Also, smart device 400 or a different smart device may obtain or determine information of its own whereabouts, and have battery replacement information stored therein, that can enable guiding a user to which device in smart-home system 100 that requires battery replacement, and how to perform the replacement. One possible exception to the idea that many of the smart devices of smart-home system 100 can perform any of these functions, is that battery health module 410 may require a physical connection to battery 405 in order to measure battery characteristics. Otherwise, tasks such as determining occupancy and usage patterns, determining location information, estimating remaining useful battery life, interfacing with a user to obtain consent for an order, placing an order, notifying a user of shipment arrival, and assisting a user in locating the device and replacing the battery, can potentially be done by many of the devices of smart-home environment 100.

Figure 5:
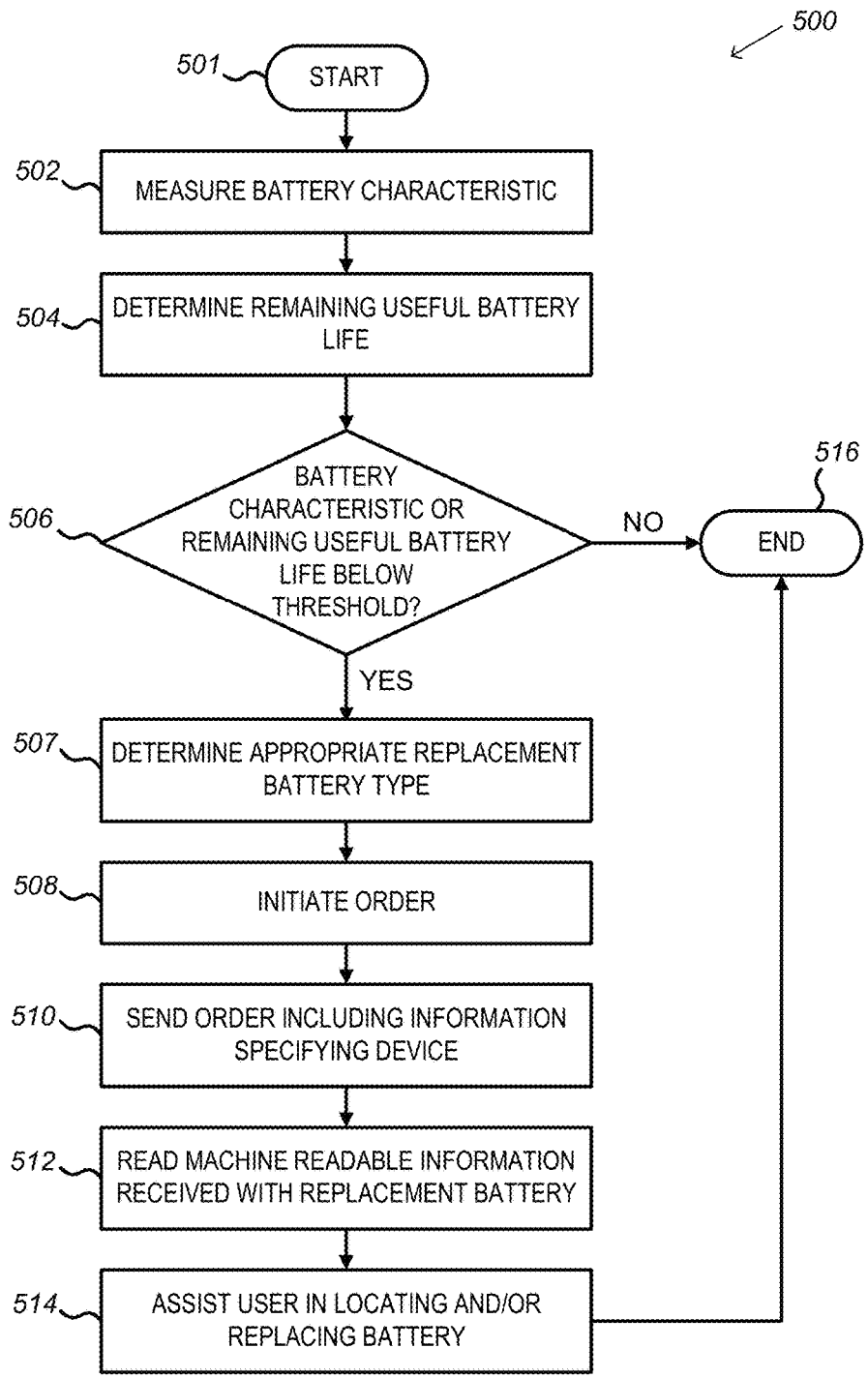
FIG. 5 is a flowchart of a method for automated replenishment of a depleted battery, in accord with an embodiment.

FIG. 5 is a flowchart of a method 500 for automated replenishment of a depleted battery of a battery powered smart device, in accord with an embodiment. An overview of the steps of method 500 is given here, with further details provided below. It will be appreciated upon reading and understanding the entire description of method 500, as well as the rest of the present disclosure, that steps of method 500 may vary in type and in order, that certain steps may be repeated, and that other steps may be added.

Method 500 starts (501) upon an initiating event that may be any of a request by a user of the smart device, addition of a new smart device to a smart-home environment, another smart device determining that the battery powered smart device is not operating properly, expiration of a timed interval or other initiating event. A battery characteristic of a smart device battery is measured (502); as discussed above the battery characteristic measured may be any of battery voltage without a load, voltage with a load, current under normal operation, current through a test load, and/or other characteristics. Remaining useful battery life is optionally determined (504); this determination may be performed by the battery operated smart device itself, or the battery characteristic may be communicated to a different smart device to determine the remaining useful battery life. Step 504 may be omitted in embodiments that base the decision that follows in step 506, directly on the battery characteristic instead of remaining useful battery life.

A smart device decides (506) if the remaining useful battery life is below a threshold; alternatively, the smart device can simply compare the battery characteristic with a threshold. Like step 504, step 506 may be performed by the battery operated smart device itself, or a different smart device. It is contemplated that the battery operated device being inoperable may also be interpreted as a battery characteristic being below the threshold. If the remaining useful battery life or battery characteristic is not below the threshold, method 500 ends (516); but if so, an ordering sequence begins, starting with determining an appropriate replacement battery type (507) for the depleted battery. With the appropriate replacement battery type determined, an order for a replacement battery is initiated (508). The order may be placed automatically, and/or with consent or other types of intervention by a user, as discussed further below.

When the order is sent (510), the order includes at least information specifying the device that the replacement battery is intended for. When the replacement battery arrives, a smart device reads machine readable information that accompanies the replacement battery (512). The smart device that reads the machine readable information, and/or other smart devices of the smart-home system, assists the user in locating the smart device requiring the battery replacement (514), and may provide information about how the replacement should be performed, as discussed further below. Method 500 ends (516).

Determining an appropriate battery type in step 507 may include a smart device of a smart-home environment accessing a table of information about the device having the depleted battery to retrieve a battery type stored therein. Alternatively, the smart device may query other smart devices of the smart-home environment for this information. In other embodiments, the smart device may search the Internet for such information. In still other embodiments, the smart device may access a website or API of a retailer, provide the device type of the device having the depleted battery, and receive the appropriate replacement battery information.

Initiating and placing an order for a replacement battery in steps 508 and 510 may be done in a variety of ways. In certain embodiments, a user interacts with a webpage or app that controls a smart-home system and preauthorizes ordering of replacement batteries. When preauthorization exists, a smart device of the smart-home system sends an order directly to a battery supplier. The battery supplier may be a company that manufactured the smart device requiring the battery replacement, a company from which the device was purchased, an authorized commerce partner of the manufacturer, or an unaffiliated company. For example, in embodiments, a smart-home system is associated with a residence and the user is an owner or occupant of the residence. In these embodiments, the battery supplier might be a retailer or a specialty battery supplier that takes orders over the Internet (e.g., through an API) and preauthorization in these embodiments might be provided by a user-controlled setting within a website or app that allows charging the cost of the replacement battery to a credit card, to another credit account or open purchase order, or by bank transfer. In other embodiments, smart-home system is a business, and the battery supplier might be an internal provisioning or office services operation within the business. Preauthorization in these embodiments may be constrained by internal business procedures and spending authorization limits. For example, in certain businesses certain personnel may be authorized to approve spending up to a certain limit and others may be authorized to approve spending up to a higher limit. The smart-home system may store authorization limit information, may refuse to accept authorization to place an order from personnel with insufficient authorization limits, but may inform such personnel of other personnel with higher authorization limits who can authorize a particular order. In any of these embodiments, preauthorization limits may also be implemented such that only orders of certain battery types, or orders below a cost limit or cumulative cost over a time period, will be placed without further confirmation by a user (of sufficient authority). In embodiments, a smart device that performs step 508 verifies cost of the replacement battery with the supplier in order to initiate an order under preauthorization, to ensure that an order that will be placed is within preauthorization limits.

Authorization to place an order may also be interactive and may depend on how a smart device communicates with a user when the authorization is given. For example, in certain embodiments, a smart device can run a webpage or app that interacts with a user to obtain authorization, either for every order to be placed, or only for those orders that exceed preauthorization limits. The webpage or app may be part of a smart-home environment management package (e.g., a webpage or app that the user calls up or otherwise interacts with from time to time, at the user's discretion), a task that appears within a utility program that compiles decisions and tasks to the user, a "pop-up" window that opens without a user request, or an alert that is visible on the webpage or app, and that the user can select for more information. The smart device that obtains the authorization may be the smart device running low on battery, or it may be a smart device that obtains information of, and obtains the authorization for a battery of a different smart device. The user's response may be an immediate confirmation or refusal to place an order, a deferral request, and/or a request for more information. For example, a user might simply indicate "ask me later" or "snooze," in which case the webpage or application may acknowledge the deferral request. Or the user might access further information, such as the battery's cost and availability, other previous or outstanding battery orders, or the current battery's estimated life. Upon receiving authorization, refusal, a deferral request or a request for more information, the webpage or app may provide a visual or audible confirmation of the authorization and/or other information, such as confirmation that an order was in fact placed, or could not be placed for some reason.

In certain embodiments, a smart device can interact with a user through verbal or other audible cues and responses, lighted and/or screen based displays (by the smart device) and/or gestures (by the user). In these embodiments, confirmation or "readback" to the user of any information exchanged may be explicit, to avoid the possibility that the smart device has incorrectly interpreted the user's intent. Also, use of verbal or gesture based interaction need not be an exclusive means of communicating with a smart-home system. For example, authorization may be obtained by means of verbal commands and/or gestures, upon which the authorization is recorded within the smart device obtaining the authorization and is made available to other devices within the smart-home system. Webpages and/or apps that access such information (e.g., from a tablet, smartphone or other computer, within or outside of the smart-home environment) will be able to show that the authorization was obtained. A user may thus interact with the smart-home environment through different modes (e.g., verbally, through gestures, or through webpages and/or apps) at different times.

In embodiments, information identifying the smart device that requires a replacement battery is forwarded when the replacement battery order is placed (e.g., in step 510 of method 500, FIG. 5). By doing so, the supplier can return information with the replacement battery that enables a smart-home system to assist a user in identifying and/or locating the smart device requiring the replacement, and optionally information about how to perform the replacement. In certain embodiments, identity of the user that authorized the order and/or is the designated user for the smart device requiring the replacement is also supplied.

The identifying information sent to the supplier in step 510 may be in any form. For example, it may specify a make and model of a smart device needing the battery, a location of the smart device, or a code that is stored in the smart-home system, and identifies the smart device (and, optionally, the authorized or designated user). The information may be explicitly included in a transmission sent to the supplier, or it may be indirect, in the form of a universal resource locator ("URL") that points to a webpage where the information may be obtained.

The information returned from the supplier with the replacement battery may also be in any form. In embodiments, the information is machine readable. For example, the information may be a printed one-dimensional barcode or a two-dimensional barcode (commonly called a "QR code"), and/or the information may be printed in any language that is machine readable. When printed in a language that is machine readable, the information may also be easily understood by the user without the smart-home environment gathering and providing the information to the user. Alternatively, the information may be stored in electronic and/or magnetic media such as a radio frequency identification ("RFID") tag, a near field communication ("NFC") tag, a universal serial bus ("USB") drive, a nonvolatile memory card (e.g., a Secure Digital or MultiMedia card (sometimes sold under the respective, trademarked names "SD™" "mini SD™" or "microSD™," "MMC," "RS-MMC," "MMC-plus," "MMCmobile," "SecureMMC" and other variations)), a magnetic disk, a compact disk ("CD" or "DVD"), or the like. Like the information sent to the supplier, the information returned with the shipment may be provided explicitly (e.g., the information itself is provided in electronic, magnetic, optical or machine readable printed form), or it may be provided indirectly (e.g., in the form of a URL that points to a webpage containing the information).

When the replacement battery arrives with the machine readable information, the machine readable information may be accessed by a device of the smart-home system (e.g., in step 512 of method 500, FIG. 5). In an embodiment, the physical presence of a shipment that includes an RFID or NFC tag may prompt an appropriate reader of such tags to read the information thereon. In other embodiments, it may be necessary for a user to open packaging of the shipment and provide the machine-readable information to a smart device of the smart-home environment. For example, a user may open the package and take a picture of a QR code or printed language information, and provide the picture to the smart-home system through a webpage or app. In another example, the user may remove electronic or magnetic media from the package and load the media into a smart device (or hold an RFID or NFC tag near the smart device) to read the information thereon. As noted above, the machine readable information may explicitly identify the device that requires the replacement battery, or it may provide a code stored in the smart-home system database, or a URL pointing to a webpage or app that identifies the device. Any information (e.g., user information, as discussed below) associated with the replacement battery, the device that requires it, particular users having an interest in the device, replacement procedure, etc. can be conveyed in this way.

The machine readable information allows the smart-home environment to provide context and information related to the newly received battery. For example, the machine readable information can enable the smart-home environment to inform and/or remind the user as to why the battery was shipped, what device it was for, replacement procedures, and the like. Once a device of the smart-home environment has this information, smart devices in the environment may take a variety of actions that can help the user locate and install the replacement battery. The machine readable information may also help in identifying a particular user who will perform the replacement. For example, in embodiments, if one particular user should be notified or is the primary user of the device that requires the replacement battery, both that use, and the user who receives the shipment, can be notified.

In embodiments, when devices or a database of the smart-home system know where the device that requires the replacement battery is, smart devices of the smart-home system can provide many types of visual and auditory signals to direct the user toward it. Such embodiments may vary widely in type and degree of cooperation among devices of the smart-home environment. For example, in certain embodiments, smart devices of the smart-home system infer mapping information about the structure and/or grounds at which they are located, and share information of each others' locations. Certain smart devices may be understood by the smart-home environment to usually be in fixed locations of the structure and/or grounds, and if a battery of one such smart device requires replacement, other devices of the system will know to direct a user to that location when a replacement battery arrives. In another example, a smart device requiring a battery replacement may be portable, and other devices within the network may track its location from time to time, such that when the replacement battery arrives, the system can direct a user to its current location (or at least a last known location, before the battery went out).

Smart devices with BLE capability can act as "beacons" such that a user with a tablet or smartphone with BLE capability can navigate among the beacons to the device that requires the replacement battery. In embodiments, a device that accesses the machine readable information activates several devices in its own vicinity, a vicinity of the user and/or a vicinity of the device with the battery needing replacement, into a guiding mode that provides a variety of cues, both from the device that accesses the machine readable information and from other devices, to the user, to assist in locating the device with the battery needing replacement. In the guiding mode, a user may start with one smart device associated with the smart-home environment (e.g., a cell phone or tablet) and the replacement battery in hand, and seek the device with the battery needing replacement. The device that the user has in hand may for example indicate, based on cooperation with other devices in the smart-home environment, that the user is getting "hotter" (nearer to, or oriented toward the device) or "colder" (further from, or oriented away from the device). As the user moves toward the device with the battery needing replacement, other devices of the smart-home environment may be activated to participate in the guiding mode, for example such devices may provide directional cues, or visual or auditory cues that say to the user, "Not me" (e.g., "I'm not the device you're looking for"). Cues that affirm that a device is not the device requiring battery replacement are referred to herein as "denial cues." If the battery needing replacement continues to power its associated device, the device can participate in the guiding mode and/or can provide its own visual, auditory and/or BLE signals to say to the user, "Me" ("I'm the device you are looking for").

The machine readable information and/or information that it points to can also assist in the replacement procedure. Diagrams, procedures, lists of any tools or specialized personnel needed, power down, start up and reprogramming protocols, and the like, can all be provided. Suggestions or warnings about functionality that may be lost while the device is powered down for battery replacement can be provided to the user performing the replacement and/or to other affected parties. For example, when the smart-home environment is a business, factory or the like, the machine readable information can initiate notification and/or coordination among affected individuals or groups that may be affected by a piece of equipment that will be unavailable while it goes down for battery replacement and starts up again.

Automated replenishment of depleted batteries according to the present disclosure may have numerous benefits. For example, in contrast to methods that order batteries on a fixed schedule and/or stockpile batteries in advance of their need, the methods herein will order and facilitate replacement of batteries substantially as needed, and not significantly sooner. This will help to reduce inventory on hand and help to ensure that replacement batteries are utilized early in their shelf-life. User tasks associated with ordering of replacement batteries will be reduced. Uptime of battery operated devices will increase, and/or battery usage will decrease, because replacement batteries will be available at the time of need instead of being replaced before necessary or after the device ceases to operate. User experience related to smart devices that can order their own batteries, and/or other devices in a smart-home system that assist in the ordering and battery replacement, will improve.

Smart devices that are capable of battery health monitoring and automated replenishment may also be able to squeeze extra life out of batteries that are near end of life. For example, in embodiments a smart device may order a replacement battery when a currently installed battery's estimated remaining useful life is about 5% of its original life. When the replacement battery arrives, it may check the currently installed battery's characteristics again, at more frequent intervals if deemed necessary, until its estimated useful life declines to 2%, 1% or less of its original life. The frequency of battery characteristic checking may be managed so that it is inversely proportional both to the accuracy of the characteristic in determining remaining useful life and the perceived importance of the functionality provided by the smart device, and/or directly proportional to the cost of the battery. Once the currently installed battery's estimated useful life declines to an unacceptably short time (or upon the device ceasing to operate, if consequences of it doing so are small) the battery can then be replaced.

Figure 6:
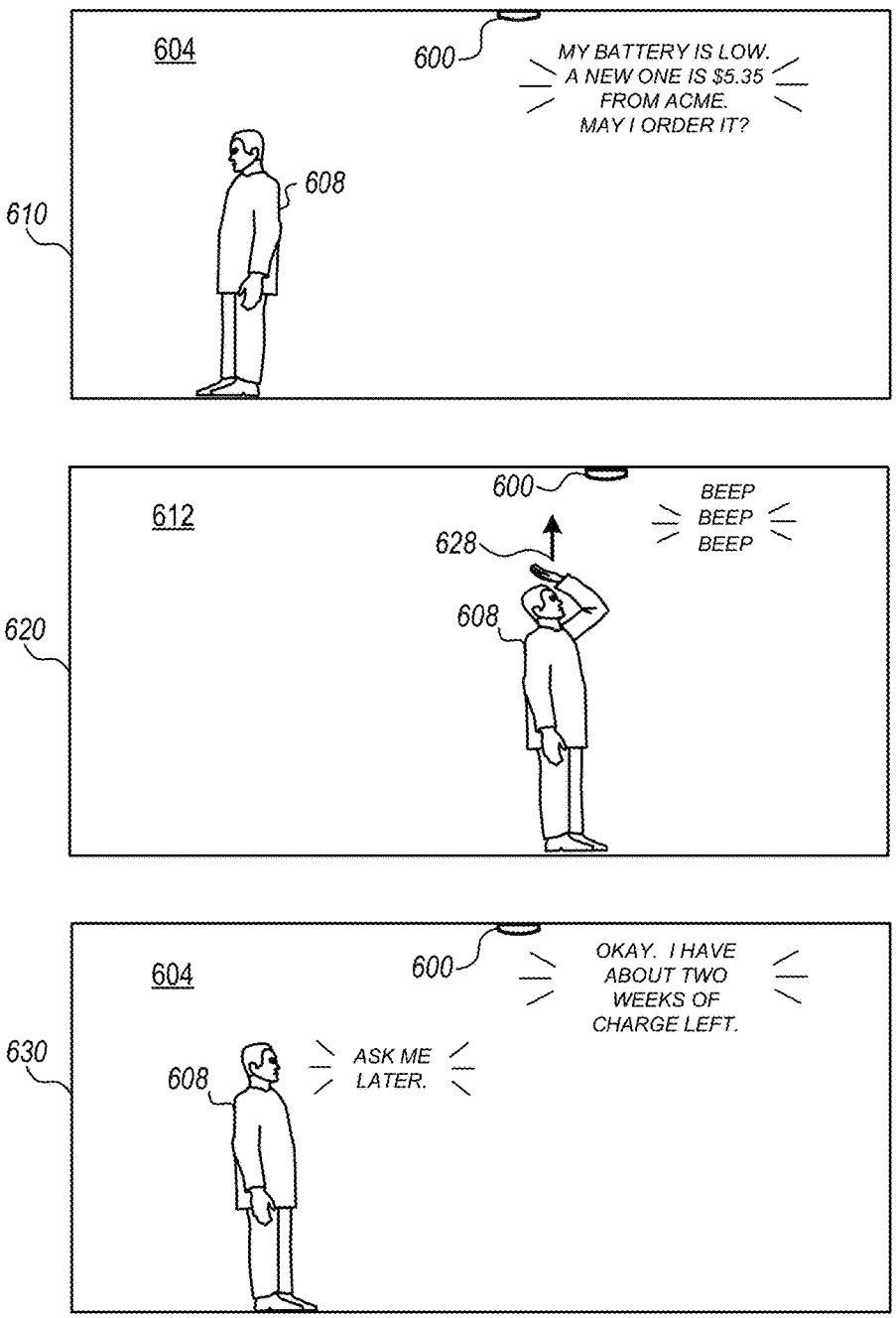
FIG. 6 schematically illustrates examples of interaction of a user with a smart device through verbal and gesture recognition, in accord with an embodiment.

FIG. 6 schematically illustrates examples of interaction of a user with a smart device through verbal and gesture recognition. In FIG. 6, the smart device seeks to obtain authorization for a battery order; it is understood that other verbal commands and responses, other audible cues and/or other gesture based responses are possible for many other activities. Such activities include but are not limited to low battery alerting, order authorization, accessing machine readable information in a battery shipment, locating a device that needs battery replacement and replacing the battery.

In a first panel 610, a smart device 600 within a smart-home environment 604 is aware of its own limited battery life, and determines that a user 608 is within hearing range. Smart device 600 states "Heads up. My battery is low. A new one is $5.35 from Acme. May I order it?"

In second panel 620, illustrating a first response scenario, user 608 responds with a gesture 628 approving the order, which smart device 600 interprets and acknowledges with a simple "beep beep beep" which may be understood by user 608 to mean "will do" or "roger that," indicating that the gesture is understood and the order will be placed.

In a second response scenario illustrated in a third panel 630, user 608 states "Ask me later" to which smart device 600 verbally replies, "Okay. I have about two weeks of charge left."

Figure 7A:
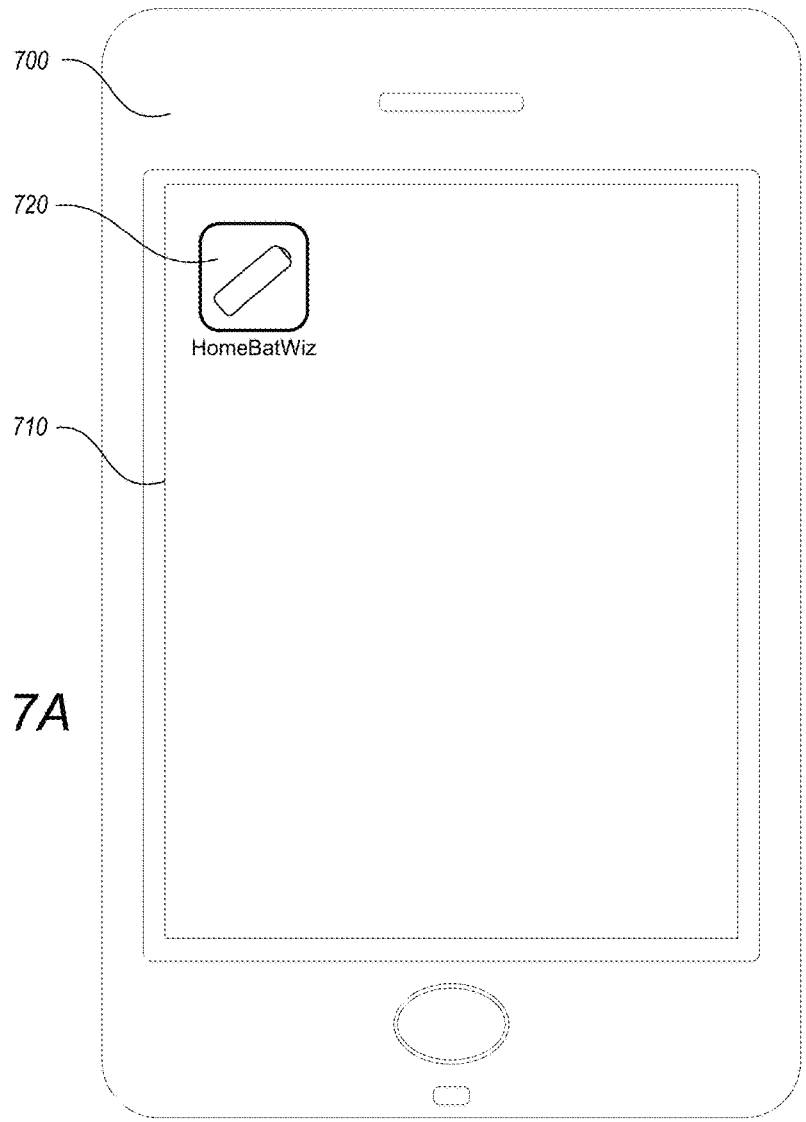
FIG. 7A schematically illustrates a smart-home controller with a display that includes an icon for an app, in accord with an embodiment.
Figure 7B:
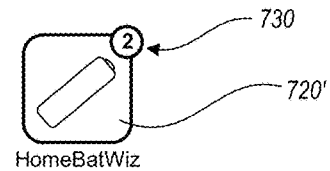
FIG. 7B illustrates an icon that is similar to the icon of FIG. 7A, but includes an "alert" indicator, in accord with an embodiment.

FIGS. 7A through 12 schematically illustrate examples of user interaction with a smart-home controller 700 through a graphical user interface ("GUI"). FIG. 7A illustrates a smart-home controller 700 (e.g., a mobile phone) with a display 710 that includes an icon 720 for an app called "HomeBatWiz." FIG. 7B illustrates a HomeBatWiz icon 720' that is similar to icon 720 but includes an "alert" indicator 730 showing a numeral 2, indicating that the HomeBatWiz app currently has two alerts associated therewith. The HomeBatWiz app may be opened by tapping on icon 720, 720'. Although FIG. 7 and other drawings herein show smart-home controller 700 as a mobile phone and the name of the app as HomeBatWiz, it is understood that in embodiments, other devices may serve as smart-home controllers, and that apps or other hardware, firmware and/or software implementations may support the functions herein and may be named differently.

Figure 8:
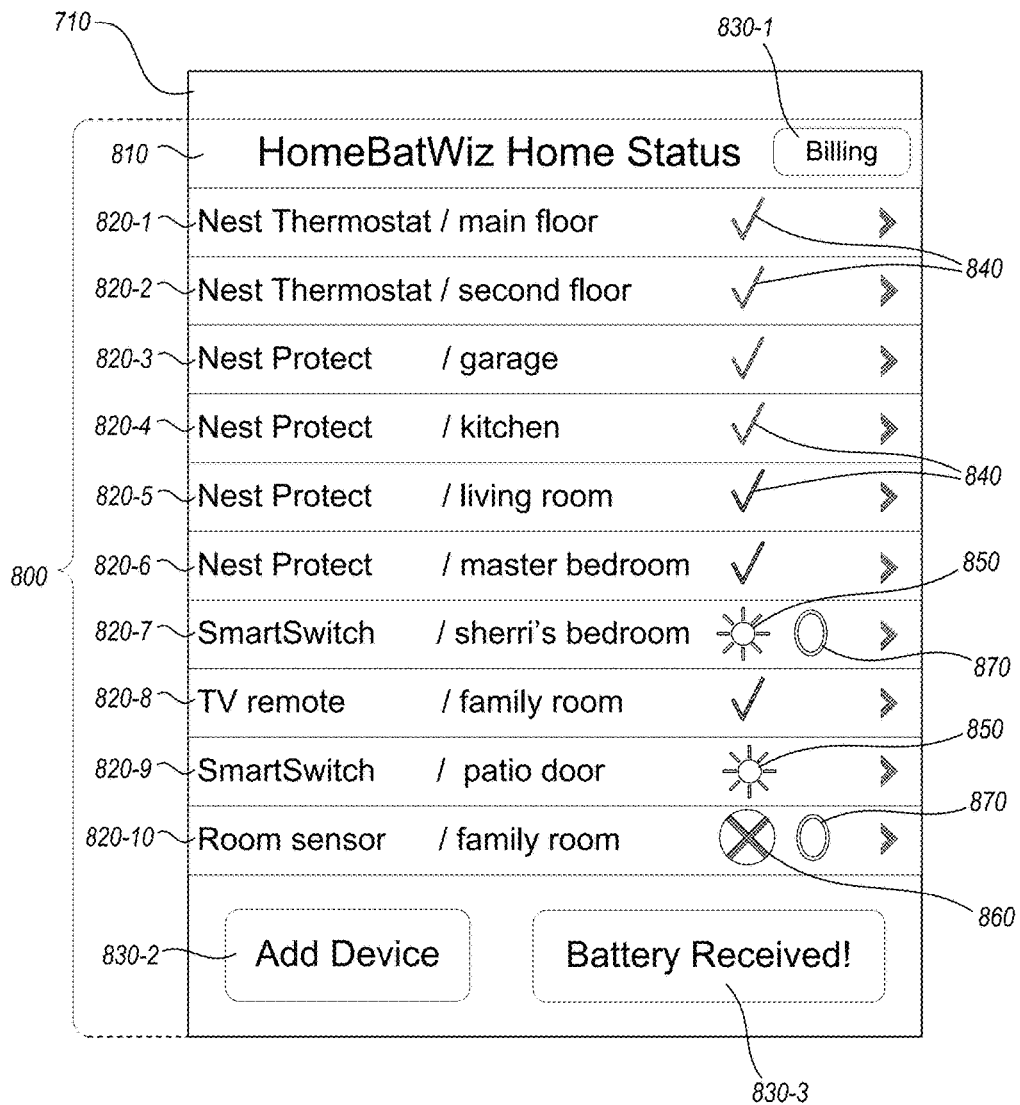
FIG. 8 illustrates an exemplary display of the smart-home controller of FIG. 7A with an app running on a home page, in accord with an embodiment.

FIG. 8 illustrates an exemplary display 710 of smart-home controller 700 (FIG. 7A) with the HomeBatWiz app running on an exemplary home page 800. Home page 800 includes a caption bar 810 that identifies a "HomeBatWiz Home Status" page. Below caption bar 810 are examples of device bars 820-1 through 820-10 that list and show status of smart devices of the smart-home environment. Each device bar 820 indicates a type of smart device, the smart device's location and icons showing battery status and ordering status for replacement batteries. Icons 840 indicate that a battery of the corresponding device is not in need of replacement. Icon 850 indicates that a battery of the corresponding device is low and should be ordered. Icon 860 indicates that a battery of the corresponding device is completely dead such that the corresponding device has ceased to operate. Icon 870 indicates that the battery for the corresponding device has been ordered. In embodiments, each device bar 820 may also function as a button that can be activated to take the HomeBatWiz app to an Alerts/Orders page for the corresponding device. Device bars 820 may form a scrolling set such that a user of smart-home controller 700 can navigate to other device bars by swiping a finger upwardly or downwardly to reveal additional device bars 820. Exemplary home page 800 also includes buttons 830 for navigation to other pages of the HomeBatWiz app; for example button 830-1 links to a Billing page; button 830-2 links to an Add Device page and button 830-3 links to a Battery Received page. The appearance and arrangement of caption bar 810, device bars 820, buttons 830 and icons 840, 850, 860, 870 are exemplary only; in embodiments, these features and others may be rearranged or provided with differing appearances, colors, brightnesses and/or functionality.

Figure 9:
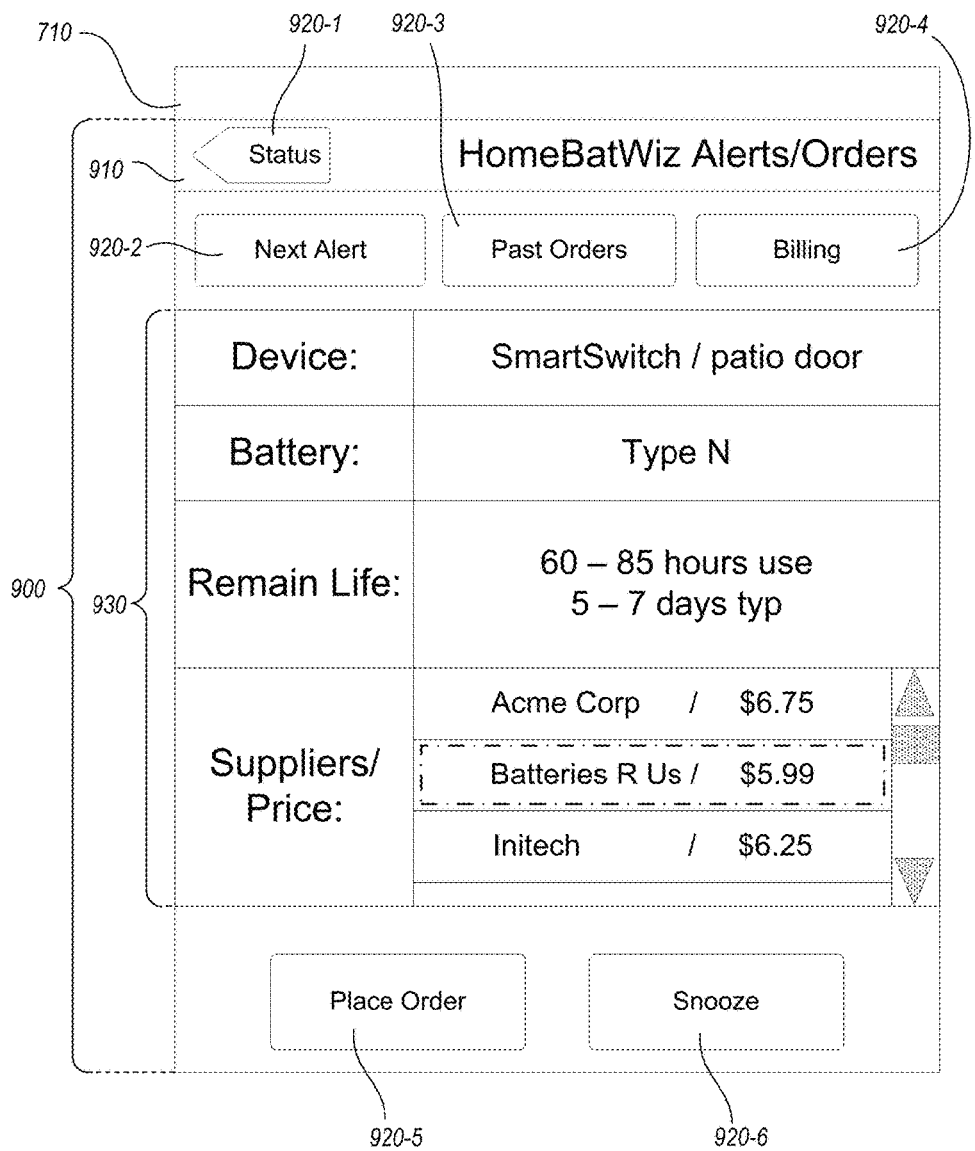
FIG. 9 illustrates an exemplary display of the smart-home controller of FIG. 7A with the app running on an exemplary Alerts/Orders page, in accord with an embodiment.

FIG. 9 illustrates display 710 of smart-home controller 700 (FIG. 7A) with the HomeBatWiz app running on an exemplary Alerts/Orders page 900. Alerts/Orders page 900 includes a caption bar 910 that identifies the "HomeBatWiz Alerts/Orders" page. Caption bar 910 includes a button 920-1 that navigates back to the HomeBatWiz Home Status page (e.g., home page 800, FIG. 8). Below caption bar 910 are buttons 920-2, 920-3 and 920-4 for navigating to the Alerts/Orders page 900 for a different device, a Past Orders review page, and the Billing page, respectively. Below buttons 920-2, 920-3 and 920-4 is a section 930 that displays detailed information of a selected device; in this example Alerts/Orders page 900 displays information of a smart patio door switch (e.g., corresponding to device bar 820-9, FIG. 8). In this example the type of battery, an estimate of its remaining life (both in hours of use and corresponding calendar days, assuming typical usage) is provided. A list of possible suppliers and their prices for the battery is also provided, with one particular supplier automatically highlighted because that supplier offers the lowest price. In embodiments, a supplier may not be highlighted or may be highlighted based on criteria other than price. In the example of FIG. 9, a user of smart-home controller 700 may scroll through the list of providers to review options and may select a different provider than was automatically highlighted. Below section 930 appear a Place Order button 920-5 and a Snooze button 920-6. Activating Place Order button 920-5 automatically places an order for the battery from the selected supplier. Activating Snooze button 920-6 does not order the battery, but instructs the HomeBatWiz app to provide a later reminder that the battery is low and will need replacement if the device is to continue functioning. It is understood that in embodiments, a home page of a smart-home controller app may provide different displays, may be arranged differently and/or may provide more or fewer functions than those shown in FIG. 9.

Figure 10:
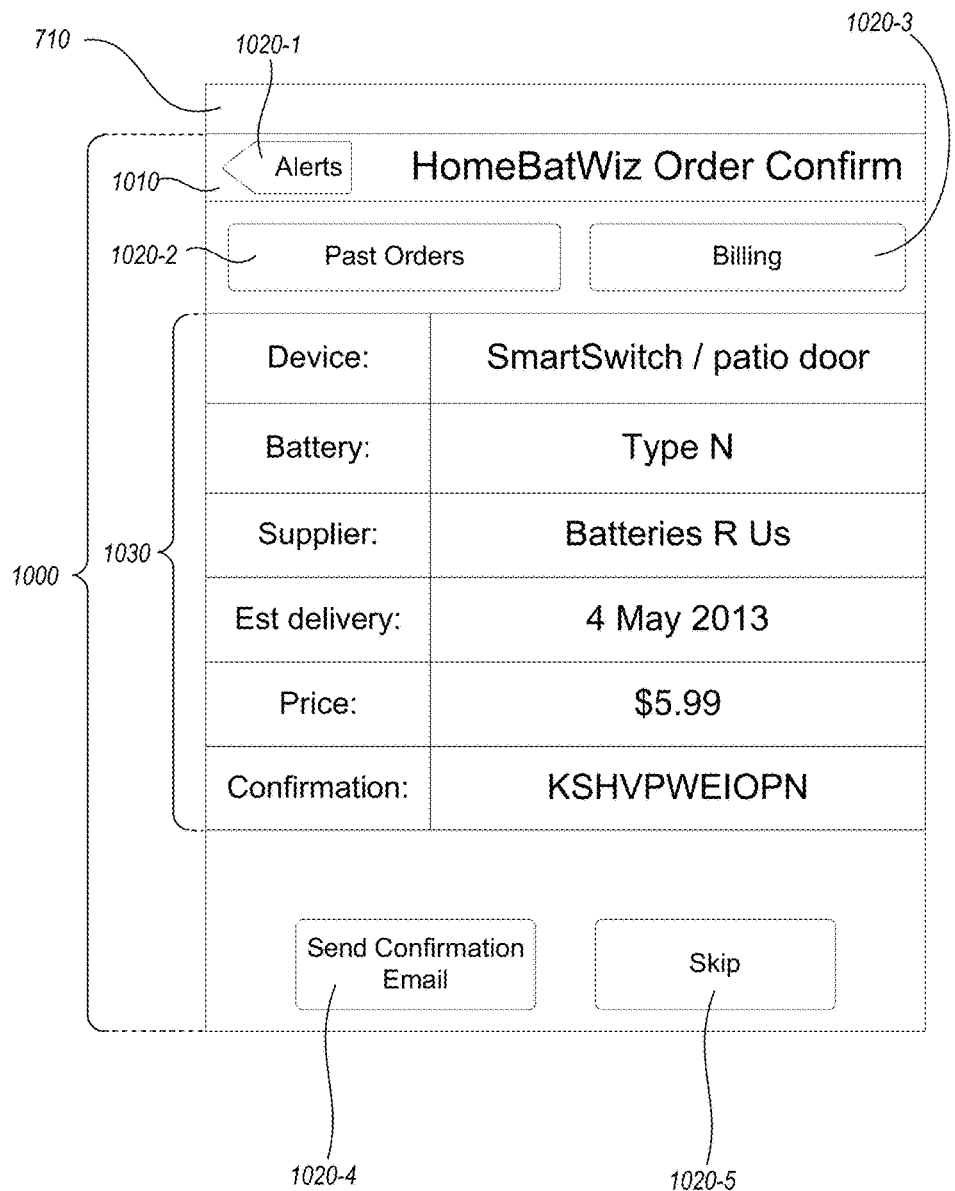
FIG. 10 illustrates an exemplary display of the smart-home controller of FIG. 7A with the app running on a Order Confirm page, in accord with an embodiment.

FIG. 10 illustrates display 710 of smart-home controller 700 (FIG. 7A) with the HomeBatWiz app running on an exemplary Order Confirm page 1000. Order Confirm page 1000 includes a caption bar 1010 that identifies the "Home-BatWiz Order Confirm" page. Caption bar 1010 includes a button 1020-1 that navigates back to the HomeBatWiz Alerts/Orders page (e.g., Alerts/Orders page 900, FIG. 9). Below caption bar 1010 are buttons 1020-2 and 1020-3 for navigating to a Past Orders page and the Billing page, respectively. Below buttons 1020-2 and 1020-3 is a section 1030 that displays detailed information of an ordered battery; in this example Order Confirm page 1000 displays information of a battery ordered for a smart patio door switch as shown in FIG. 9. In this example, the device the battery is ordered for, the battery type, the supplier from whom the battery was ordered, price of the battery, an estimated delivery date and a confirmation code are shown. Below section 1030 are a Send Confirmation Email button 1020-4 and a Skip button 1020-5. Activating Send Confirmation Email button 1020-4 causes the HomeBatWiz app to automatically send an email confirmation to a predetermined electronic mail address that confirms the order. Activating Skip button 1020-5 does not send the email, and may instead send the HomeBatWiz app to a previous page, such as home page 800. Order confirmation functionality of a smart-home controller app may be implemented differently than the specific page shown in FIG. 10; for example embodiments may provide different displays, may be arranged differently and/or may provide more or fewer functions than those shown in FIG. 10, or order confirmation may be provided in other forms, such as implicitly or in combination with other pages of an app.

Figure 11:
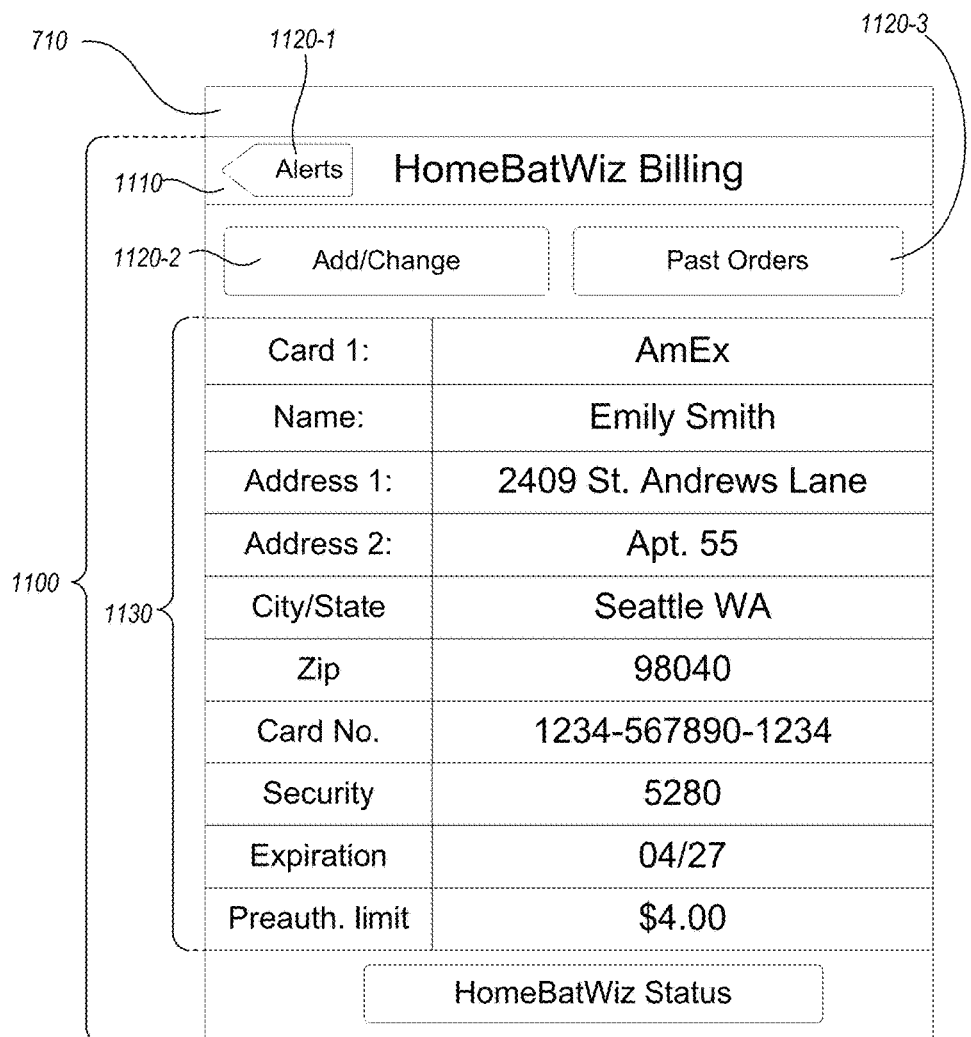
FIG. 11 illustrates an exemplary display of the smart-home controller of FIG. 7A with the app running on a Billing page, in accord with an embodiment.

FIG. 11 illustrates display 710 of smart-home controller 700 (FIG. 7A) with the HomeBatWiz app running on an exemplary Billing page 1100. Billing page 1100 includes a caption bar 1110 that identifies the "HomeBatWiz Billing" page. Caption bar 1110 includes a button 1120-1 that navigates back to an Alerts/Orders page (e.g., Alerts/Orders page 900, FIG. 9). Below caption bar 1110 are buttons 1120-2 and 1120-3 for navigating to an Add/Change page and the Past Orders page, respectively. In the Add/Change page can be utilized to add information of a new credit card to the HomeBatWiz app, or to change information associated with a credit card, such as any of the information shown in a section 1130 below. Below buttons 1120-2 and 1120-3 is section 1130 that displays information associated with a credit card; in this example section 1130 displays information of a credit card type, the cardholder's name and address, the card number, a security code and expiration date associated with the card, and a preauthorization limit for the card. The information displayed in section 1130 may be modified according to the specifics of a smart-home environment; for example by adding or substituting business names, department or mail stop identifications, country information and the like. Below section 1130 is a Home-BatWiz status button 1120-4 that causes the HomeBatWiz app to automatically return to its home page 800. The HomeBatWiz app may hold information on various cards or other billing arrangements and may provide ways to navigate among such arrangements, or may be capable of displaying and/or managing such information of multiple cards on a single page or screen. It is understood that billing functionality of a smart-home controller app may be implemented differently than the specific page shown in FIG. 11. For example, embodiments may provide different displays, may be arranged differently and/or may provide more or fewer information fields or functions than those shown in FIG. 11, or billing functionality may be combined into other pages of an app.

Figure 12A:
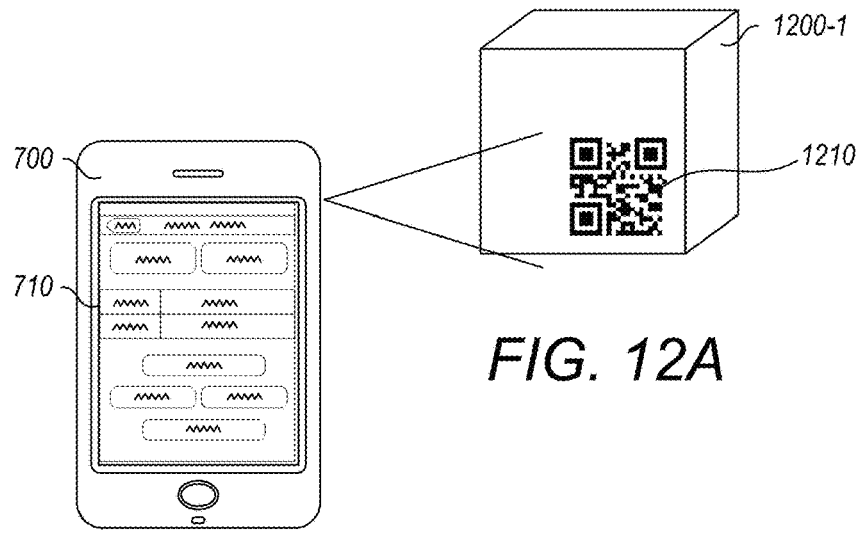
FIGS. 12A, 12B and 12C illustrate ways for a smart-home environment to acquire machine-readable information about a received battery, in accord with embodiments.
Figure 12B:
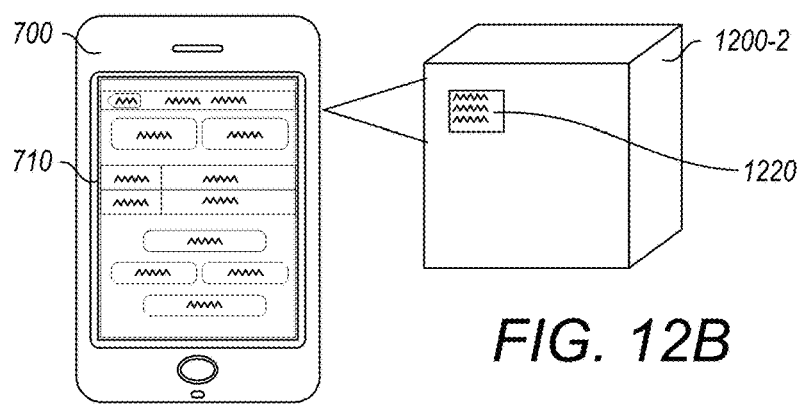
Figure 12C:
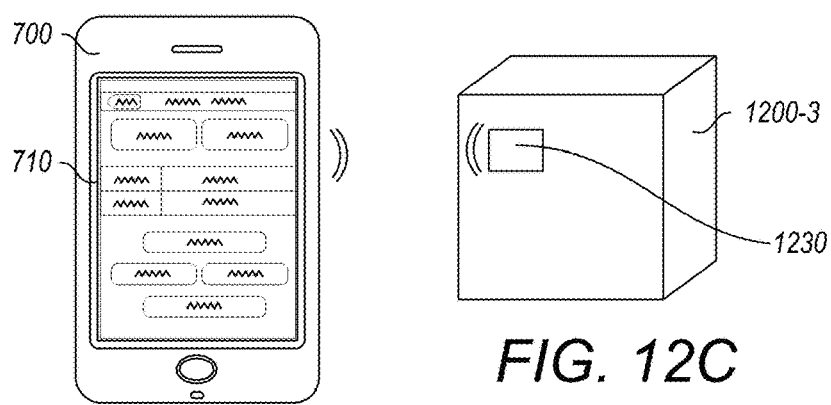

FIGS. 12A, 12B and 12C illustrate ways for a smart-home environment to acquire machine-readable information about a received battery. FIGS. 12A, 12B and 12C feature smart-home controller 700 (FIG. 7A) acquiring the information, but it is appreciated that devices that are not necessarily smart-home controllers can acquire the information through similar modes of operation, and can communicate the information to other devices of the smart-home environment. In FIG. 12A, a camera or scanner of smart-home controller 700 images a QR code 1210 on a package 1200-1. QR code 1210 is a machine readable expression of a code corresponding to contents of package 1200-1. In FIG. 12B, a camera or scanner of smart-home controller 700 images printed information 1220 on a package 1200-2. Printed information 1220 is a machine readable expression of a code corresponding to contents of package 1200-2. A machine readable expression may be on an outside of the respective package, shown in FIGS. 12A and 12B, or printed on a packing slip, a box or other packing material within the respective package. In FIG. 12C, a powered or unpowered device 1230, such as an RFID or NFC chip, or a low power Bluetooth device, transmits a machine readable expression of a code corresponding to contents of package 1200-3.

Upon acquiring a machine-readable expression of a code, such as by reading QR code 1210, printed information 1220 and/or device 1230, the smart-home environment (either smart-home controller 700, or another smart device to which the code is sent by smart-home controller 700) can identify one or more order(s) that were placed and batteries that were shipped in response to the orders. This information can, in turn, be utilized by smart-home controller 700 and/or other devices to cooperate in a guiding mode to guide a user to the device that needs the received batteries, and/or provide installation instructions for the batteries. The machine readable expression can be a code corresponding to a single order or to multiple orders.

Figure 13:
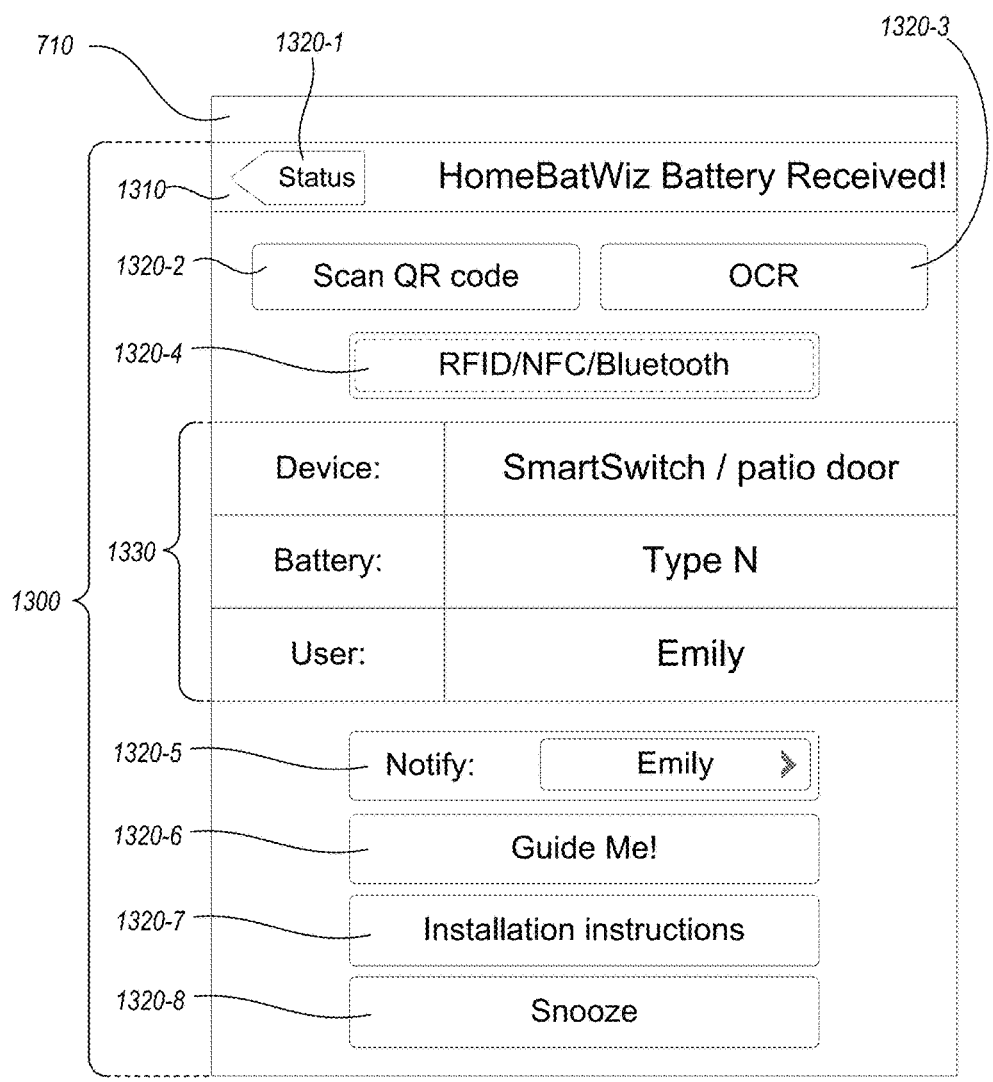
FIG. 13 illustrates an exemplary display of the smart-home controller of FIG. 7A with the app running on a Battery Received page, in accord with an embodiment.

FIG. 13 illustrates display 710 of smart-home controller 700 (FIG. 7A) with the HomeBatWiz app running on an exemplary Battery Received page 1300. Battery Received page 1300 includes a caption bar 1310 that identifies the "HomeBatWiz Battery Received" page. A user may navigate to Battery Received page 1300 from home page 800 (FIG.

8) using Battery Received! button 830-3, by using other navigational aids in the HomeBatWiz app, or smart-home controller 700 may open the HomeBatWiz app automatically at the Battery Received page when it acquires a machine readable expression corresponding to one or more battery orders, as discussed in connection with FIGS. 12A through 12C. In Battery Received page 1300, a caption bar 1310 includes a button 1320-1 that navigates back to the HomeBatWiz Home Status page (e.g., Home Status page 800, FIG. 8). Below caption bar 1310 are buttons 1320-2, 1320-3 and 1320-4 for initiating a QR code scan, a scan of printed characters upon which to perform optical character recognition (OCR), or wireless detection via RFID, NFC and/or Bluetooth, respectively. In alternate embodiments, button 1320-4 may be simply a status indicator capable of displaying that an RFID, NFC and/or Bluetooth machine readable expression was already acquired, without the user initiating the acquisition.

Below buttons 1320-2, 1320-3 and 1320-4 in Battery Received page 1300 is a section 1330 that displays information associated with at least one battery order. In this example section 1330 displays information of a device, a battery received for that device, and a principal user of that device (the principal user is noted simply as "user" in FIG. 13). In embodiments, principal user information is associated with an order when a smart-home environment has more than one established occupant or user. This allows the system to helpfully notify the principal user, when a user who receives a battery is not the principal user who is more likely to use or install the battery. For example, a user named Emily could be an owner or head of household of a smart-home environment, but another user named Sherri could receive incoming mail, including a battery shipment. Smart-home controller 700 is typically operated by one particular person, and when the HomeBatWiz app knows who that person is, it may recognize orders originated by other principal users of devices in the smart-home environment, so that those principal users may appropriately notified. In the example shown in FIG. 13, smart-home controller 700 is operated by Sherri, so Battery Received page 1300 suggests that Emily be notified. The Battery Received page may provide the person operating smart-home controller 700 with other options of users to be notified, and/or may offer one or more options for notifying such users (e.g., by phone call, text message or electronic mail).

Below section 1330 are buttons 1320-5, 1320-6, 1320-7 and 1320-8 that cause the HomeBatWiz app to notify a different user of the battery's receipt, to enter a guiding mode, to provide installation instructions, or to snooze. Button 1320-5 may include a field that is populated by the app with information of a particular user (e.g., a user who authorized a battery order) but can be updated to provide notification to a different user if desired. The guiding mode is described below in connection with FIGS. 14 and 15. The Snooze instruction may cause the HomeBatWiz app to temporarily ignore receipt of a battery, but remind the user later that the battery was received. It is understood that actions of a smart-home controller app when a battery is received may be implemented and/or displayed differently than the specific page shown in FIG. 13. For example, an app may provide different displays, arrangement of displayed items and/or more or fewer information fields or functions than those shown in FIG. 13.

Figure 14:
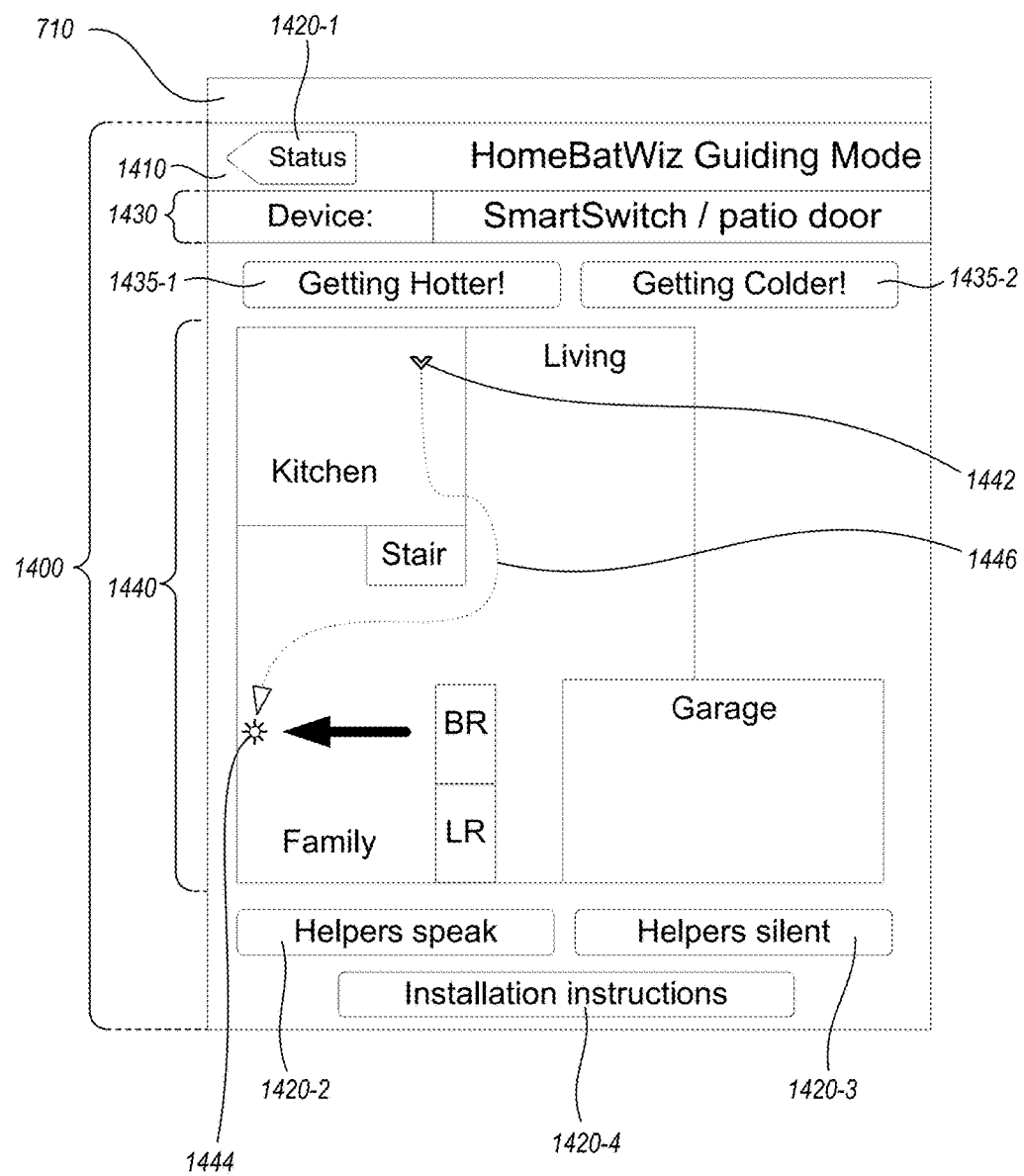
FIG. 14 illustrates an exemplary display of the smart-home controller of FIG. 7A with the app running on a Guiding Mode page, in accord with an embodiment.

FIG. 14 illustrates display 710 of smart-home controller 700 (FIG. 7A) with the HomeBatWiz app running on an exemplary Guiding Mode page 1400. Guiding Mode page 1400 includes a caption bar 1410 that identifies the "Home-BatWiz Guiding Mode" page. A user may navigate to Guiding Mode page 1400 from Battery Received page 1300 (FIG. 13) using Guide Me! button 1320-5, by using other navigational aids in the HomeBatWiz app, or smart-home controller 700 may enter a guiding mode automatically when it acquires a machine readable expression corresponding to one or more battery orders, as discussed in connection with FIGS. 12A through 12C. In Guiding Mode page 1400, caption bar 1410 includes a button 1420-1 that navigates back to the HomeBatWiz Home Status page (e.g., Home Status page 800, FIG. 8). Below caption bar 1410 is a panel 1430 that identifies a device that the user of smart-home controller 700 will be guided to in Guiding Mode. Below panel 1430 are indicators 1435-1 and 1435-2 that change in response to the position and/or orientation of smart-home controller 700 relative to the position of the device indicated in panel 1430. For example, when a user holding smart-home controller 700 turns or moves within the smart-home environment, indicators 1435-1 and/or 1435-2 may change in appearance, color and/or brightness to help the user understand whether he or she is getting closer to the device requiring a battery (hotter) or further from it (colder). In embodiments, smart-home controller 700 determines its own position and/or orientation by utilizing Global Positioning System ("GPS") functionality to determine position, and accelerometers and/or magnetometers to determine orientation and movement. In addition or alternatively, other devices of the smart-home environment participate in determining position and/or orientation of smart-home controller 700 relative to other devices by assessing signal strength and directionality of signals thereamong, for example by determining strength of a WiFi signal or low-energy Bluetooth beacon.

Below indicators 1435-1 and 1435-2 is a map panel 1440 that provides at least an approximate map of the smart-home environment, with indications of the user's (or smart-home controller 700's) initial location 1442, a location 1444 of the device requiring battery replacement, and a path 1446 that the user of smart-home controller 700 can take to get to the device requiring battery replacement. The layout shown in map panel 1440 may be explicitly provided to the smart-home environment, may be developed by the smart-home environment through inferences based on data from sensors and other devices in the smart-home environment, or may be a combination of both an explicit layout and inferred locations.

Besides the smart-home controller, other smart devices of the smart-home environment can be activated, in the guiding mode, to provide audible and/or visual cues to assist in locating the device that requires battery replacement. Because audible cues may be considered undesirable at times (e.g., because they might disturb occupants), beneath map panel 1440 are buttons 1420-2 and 1420-3 for instructing other devices of the smart-home system to "speak" (provide audible cues), be silent (do not provide audible cues). Another button 1420-4 requests the smart-home controller 700 to provide installation instructions.

In embodiments, a guiding mode implemented through a smart-home controller app when a battery is received may depart from the specific behavior described above and the specific page shown in FIG. 14. For example, a guiding mode may include different displays, arrangement of displayed items and/or more or fewer information fields or functions than those shown in FIG. 14. A map type layout such as depicted in map panel 1440 may be about as explicit as that shown in FIG. 14, or more explicit when corresponding data is available to the app, for example accurately indicating multiple stories, knowing where walls impede motion but doors allow movement therethrough, and the like. Alternatively, the layout depicted in map panel 1440 may be less explicit than that shown in FIG. 14, for example lacking any information about walls, and including a display of items whose location is only partially known, but may serve as guideposts for a user seeking to locate the device. Also, when a device requiring battery replacement is not installed at a fixed location, further techniques may be utilized to guide a user to the device, such as devices of the smart-home environment communicating with the device whose battery requires replacement, and with one another, to determine a current position of the device and to guide the user to it.

Figure 15:
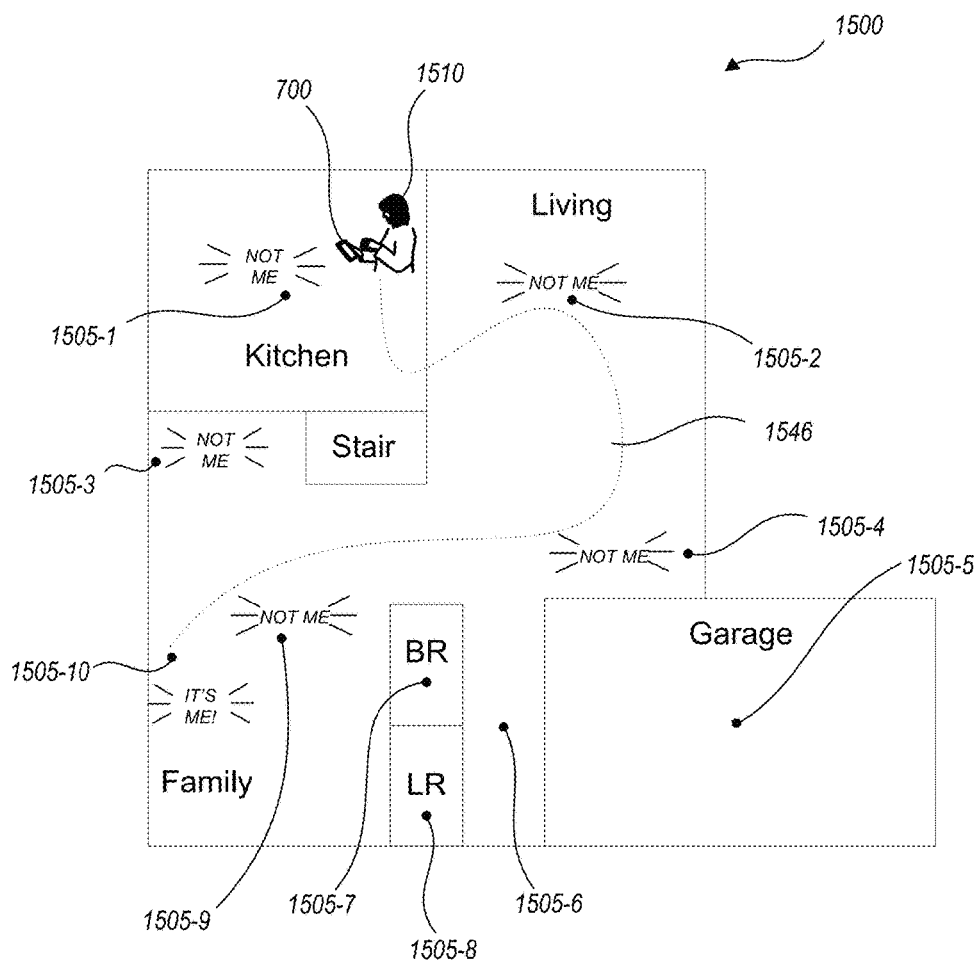
FIG. 15 schematically illustrates a portion of a smart-home environment corresponding to the layout depicted in FIG. 14, in accord with an embodiment.

FIG. 15 schematically illustrates a portion of a smart-home environment 1500 corresponding to the layout depicted in map panel 1400, FIG. 14. In smart-home environment 1500, certain devices 1505 are capable of cooperating in a guiding mode that helps a user with a smart-home controller locate a device that requires a battery replacement. For example, as shown in FIG. 15, a user 1510 may utilize a smart-home controller 700 to initiate the guiding mode while in the kitchen where she has opened a package containing a battery. Smart-home controller 700 and/or other devices of smart-home environment 1500 determine an initial location of smart-home controller 700, and update its position as the user moves about smart-home environment 1500 with smart-home controller 700. Device 1505-1, in a kitchen of smart-home environment 1500, may provide an audible cue (such as saying, "not me") and/or an equivalent visual cue (e.g., a red light) to user 1510 to indicate that device 1505-1 is not the device requiring battery replacement. Participation in the guiding mode by a given smart device is dependent on individual device capabilities; that is, not all devices in the smart-home environment 1500 will be capable of providing audible and/or visible cues. User 1510 may follow a path indicated in smart-home controller 700 (e.g., path 1446, FIG. 14) or some other path within smart-home environment 1500; an exemplary path 1546 is shown in FIG. 15. As user 1510 follows path 1546, certain other devices 1505 along path 1546 may provide audio and/or visual cues to indicate that they, too, are not the device requiring battery replacement, while devices 1505 that are not within a predetermined distance from smart-home controller 700 at a given time may not provide cues. When user 1510 nears device 1505-10 that is the device requiring battery replacement, device 1505-10 may (if it has the capability) provide an audible cue (such as saying "it's me!") and/or an equivalent visual cue (e.g., a green or flashing light) to draw user 1510's attention and confirm the identity of device 1505 as the device requiring battery replacement.

Figure 16:
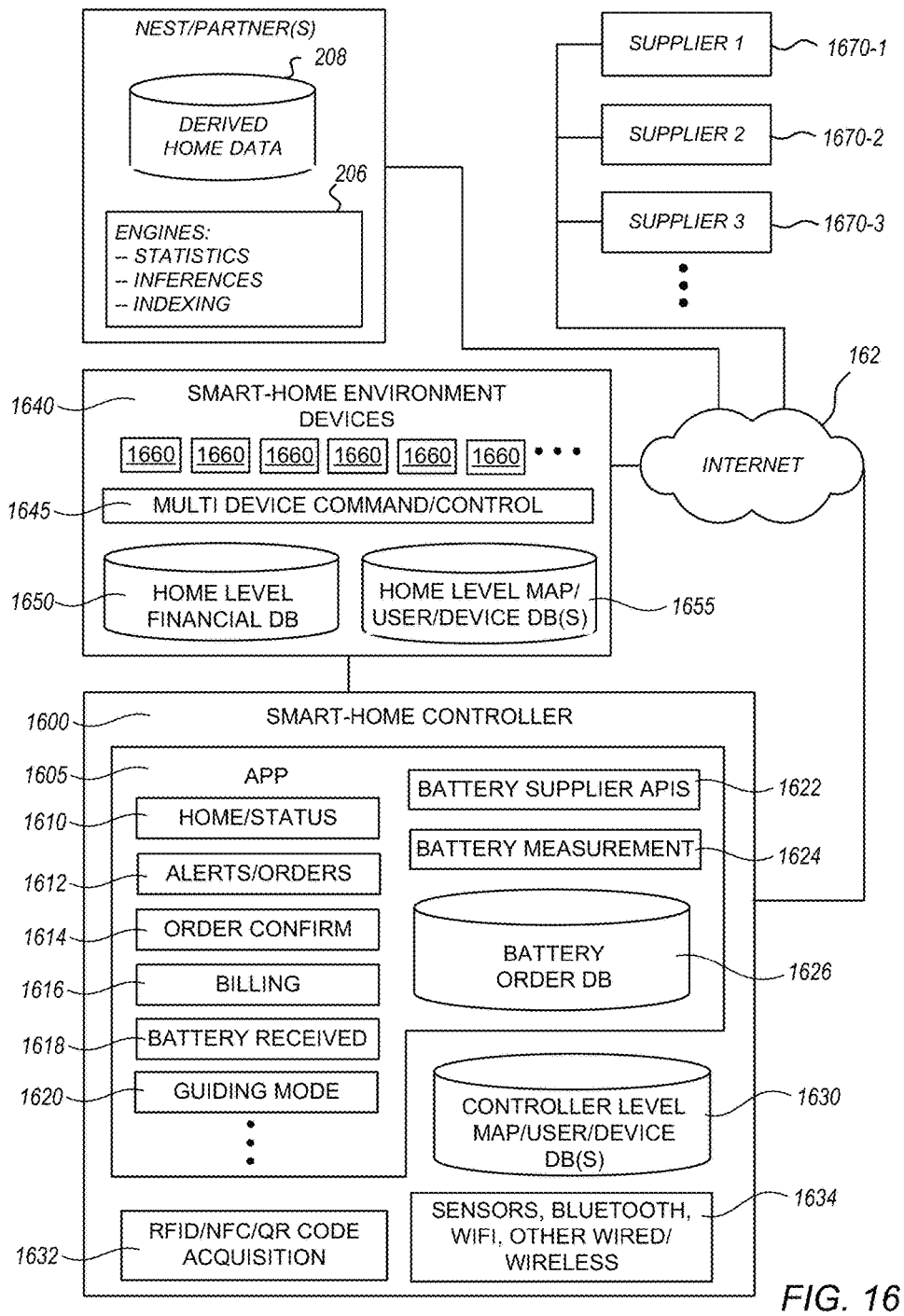
FIG. 16 schematically illustrates a network topography that supports systems and methods that facilitate battery replacement, in accord with embodiments.

FIG. 16 schematically illustrates a network topography that supports systems and methods that facilitate battery replacement as described elsewhere herein. It should be understood that the network topography illustrated in FIG. 16 is exemplary only for purposes of providing an example of how the illustrated components work together. Specific embodiments that implement many modifications or alternative arrangements to the topography shown will readily be conceived by those skilled in the art by reading and understanding FIG. 16 in combination with other drawings and descriptions herein.

Smart-home controller 1600 (an example of smart-home controller 700, FIG. 7 and other drawings) runs an app 1605 that performs many of the functions herein. Smart-home controller 1600 is typically a smart phone, tablet or laptop computer device, but could also be any type of computing system with appropriate hardware and software functionality. For example, many presently available, portable devices operating on iOS or Android platforms that do not fit cleanly into "smart phone" or "tablet" categories, and less portable systems typically thought of as "desktop" systems operating on Windows or MacOS platforms, and others, may act as smart-home controller 1600. The HomeBatWiz app described in FIGS. 7-14 is an example of app 1605. App 1605 supports implementation of a variety of pages or screens that may be presented to a user, such as a home/status page 1610, an alerts/orders page 1612, an order confirmation page 1614, a billing page 1616, a battery received page 1618, a guiding mode page 1620, and possibly others. App 1605 also typically includes functions used by the systems and methods herein to support battery measurement, ordering from suppliers, and store orders, such as one or more battery supplier application program interface(s) 1622, battery measurement function 1624 and a database 1626 for battery orders. However, in embodiments, application program interface(s) 1622, battery measurement function 1624 and battery order database 1626 may be accessed by other apps or functionality within smart-home controller 1600. Smart-home controller also includes a variety of general purpose data stores and functions that are utilized both by systems and methods that facilitate battery replacement as described herein, as well as other functions of the controller. These general purpose data stores and functions include a local database 1630 for smart-home map information, user and device associations, hardware and software functionality 1632 that support acquisition of data by acquiring data from RFID and NFC chips and QR codes, as well as general purpose sensors and wired and wireless connectivity features 1634.

Smart-home controller 1600 is shown separately from, but is one of a plurality of devices that form and/or are associated with a smart-home environment 1640. That is, a plurality of intercommunicating devices 1660 may be thought of "forming" environment 1640, but other devices can be temporarily or permanently "associated with" environment 1640. For example, several occupants of a home may have devices that include some or all of the functionality needed to act as smart-home controller 1600, and one or more than one of such devices may be granted access and/or authority over environment 1640, thus all becoming smart-home controllers 1600. Smart-home controllers 1600 may also be selectively granted access and/or authority over environment 1640 based on their location; that is, some controllers may retain access and/or authority over environment 1640 when they are not in physical proximity to environment 1640, while other controllers 1600 may be denied access and authority, or granted only partial access and/or authority, when not in physical proximity to environment 1640.

Many of the devices shown in FIG. 1 (e.g., smart thermostats 102, smart hazard detectors 104, universal sensors 105, smart doorbells 106, smart wall switches 108, smart wall plugs 110, smart appliances 112, wireless router 160, smart nightlight 170, hub 180, smart camera 182 and smart door lock 184) are examples of devices 1660. Typically, one or more of devices 1660 has multi-device command and control authority 1645 over other devices 1660. Many such command and control authority relationships may exist; for example devices 1660 may be empowered to query one another for information, respond to such queries, request actions from one another, and acknowledge, perform and/or refuse such requests. One or more devices 1660 of smart-home environment 1640 may also include home level databases characterizing the smart-home environment, such as a financial database 1650, and/or a database 1655 that compiles home level map information, information of users within smart-home environment 1640, and the devices 1660 that form the smart-home environment.

Within smart-home environment 1640, all of devices 1660 and controller(s) 1600 have at least some capability to send and/or receive signals locally. At least one such device, as well as controller(s) 1600, also has the capability to communicate with Internet 162, as shown. Such communication may be wired or wireless. Through Internet 162, smart-home environment 1640 and/or controller(s) 1600 may also reach additional cloud-based information and resources, such as derived home data 208, processing engines 206 (also shown in FIG. 2), and battery suppliers 1670 (examples of businesses 228, FIG. 2).

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

What is claimed is:

1. A method to facilitate battery replacement in a smart-home system comprising a plurality of smart-home devices in a home, the method comprising:
   measuring, by a first smart-home device of the plurality of smart-home devices, using an on-board battery health module, a voltage of a first battery contained in the first smart-home device;
   determining from the measured voltage, by one or more of the plurality of smart-home devices, whether replacement of the first battery is warranted;
   responsive to determining that replacement of the first battery is warranted, sending, by the one or more of the plurality of smart-home devices, an electronic order to a supplier for a replacement battery for the first smart-home device;
   reading, using a camera of one or more of the plurality of smart-home devices, a machine readable barcode that accompanies a shipment of the replacement battery;
   accessing, by the one or more of the plurality of smart-home devices, a battery order database based on reading the machine readable barcode that accompanies the shipment of the replacement battery;
   determining, based at least in part on information retrieved from the battery order database, a name of the first smart-home device and a location of the first smart-home device within the home, wherein the location is indicative of a name of a room in the home in which the first smart-home device is located;
   providing, by one or more of the smart-home devices, a user interface that displays information to a user that guides the user to said location of the first smart-home device, the user interface indicating the name of first smart-home device and the name of the room in which the first smart-home device is located, wherein the first smart-home device is distinct from the smart-home device of the one or more of the plurality of smart home devices that provides the user interface; and
   receiving, by the first smart-home device, the replacement battery such that the first smart-home device is powered using the replacement battery.

2. The method to facilitate battery replacement in a smart-home system of claim 1, wherein:
   the machine readable barcode is a QR code.

3. The method to facilitate battery replacement in a smart-home system of claim 1, wherein:
   reading the machine readable barcode comprises reading the machine readable barcode with a smart-home controller of the smart-home system; and
   providing the user interface to the user includes:
      determining, with the smart-home controller, an initial location of the smart-home controller; and
      providing cues that guide the user from the initial location of the smart-home controller to the location of the first smart-home device within the home.

4. The method to facilitate battery replacement in a smart-home system of claim 3, wherein providing the cues that guide the user comprises displaying a layout of the home on the smart-home controller.

5. The method to facilitate battery replacement in a smart-home system of claim 4, wherein the layout includes an indication of a path through the layout, from the initial location of the smart-home controller to the location of the first smart-home device.

6. The method to facilitate battery replacement in a smart-home system of claim 3, wherein providing the cues that guide the user comprises providing one or more indications on the smart-home controller to inform the user about getting closer to, or further from, the location of the first smart-home device.

7. The method to facilitate battery replacement in a smart-home system of claim 3, wherein providing the cues that guide the user comprises:
   activating one or more devices of the plurality of smart-home devices, that are not the first smart-home device, to provide one or more denial cues from ones of the one or more activated devices, to inform the user that the one or more activated devices that provide the denial cues are not the first smart-home device.

8. The method to facilitate battery replacement in a smart-home system of claim 7, wherein activating the one or more devices of the plurality of smart-home devices, that are not the first smart-home device, to provide the one or more denial cues further comprises:
   transmitting a command, from the smart-home controller to the one or more activated devices, that requires the one or more activated devices to provide the denial cues silently.

9. The method to facilitate battery replacement in a smart-home system of claim 7, wherein activating the one or more devices of the plurality of smart-home devices, that are not the first smart-home device, to provide the one or more denial cues further comprises:
   transmitting a command, from the smart-home controller to the one or more activated devices, that requests audible denial cues from ones of the one or more activated devices that are capable of providing audible cues.

10. The method to facilitate battery replacement in a smart-home system of claim 3, wherein providing the cues that guide the user comprises activating the first smart-home device to provide a cue that informs the user of its particular identity as the first smart-home device.

11. The method to facilitate battery replacement in a smart-home system of claim 1, wherein:
   reading the machine readable barcode is performed by a smart-home controller of the smart-home system;
   and further comprising:

determining, by the smart-home controller, if a person operating the smart-home controller is a principal user of the first smart-home device; and responsive to determining that the person operating the smart-home controller is not the principal user of the first smart-home device, informing the person operating the smart-home controller of an identity of the principal user.

12. The method to facilitate battery replacement in a smart-home system of claim 11, further comprising:

responsive to determining that the person operating the smart-home controller is not the principal user of the first smart-home device, offering, by the smart-home controller, to notify the principal user of the first smart-home device by text message, phone call or electronic mail, that the replacement battery has been received.

13. A smart-home system that recognizes and facilitates replacement of batteries in devices in a home, comprising:

a plurality of smart-home devices configured for wireless communication with one another, the plurality of smart-home devices including one or more battery operated devices; wherein:

at least one of the plurality of smart-home devices measures a voltage of a first battery, while the first battery is in operation within a first smart-home device of the one or more battery operated devices;

at least one of the plurality of smart-home devices determines, from the measured voltage, whether replacement of the first battery is warranted;

responsive to determining that replacement of the first battery is warranted, at least one of the plurality of smart-home devices sends an electronic order to a supplier for a replacement battery for the first smart-home device;

one of the plurality of smart-home devices, using a camera, reads a machine readable code that is received in a shipment of the replacement battery, the code embodying information from which a particular identity of the first smart-home device can be determined, one of the plurality of smart-home devices accesses a battery order database based on reading the machine readable code that accompanies the shipment of the replacement battery;

one of the plurality of smart-home devices determines, based at least in part on information retrieved from the battery order database, a name of the first smart-home device and a location of the first smart-home device within the home, wherein the location is indicative of a name of a room in the home in which the first smart-home device is located;

one or more of the plurality of smart-home devices provides a user interface that displays information to a user that guides the user to said location of the first smart-home device, the user interface indicating the name of first smart-home device and the name of the room in which the first smart-home device is located, wherein the first smart-home device is distinct from the smart-home device of the one or more of the plurality of smart home devices that provides the user interface; and the first smart-home device receiving the replacement battery.

14. The smart-home system of claim 13, wherein the one of the plurality of smart-home devices that reads the machine readable code extracts the code from one of a QR code, an RFID chip and an NFC chip.

15. The smart-home system of claim 13, wherein one of the plurality of smart-home devices is a smart-home controller that provides functionality for at least one of reading the machine readable code, determining the location of the first smart-home device and providing the information to the user by running an app.

16. The smart-home system of claim 15, wherein the smart-home controller identifies an initial location of the smart-home controller and the location of the first smart-home device within the home, and provides cues to the user to guide the user from the initial location of the smart-home controller to the location of the first smart-home device.

17. The smart-home system of claim 16, wherein the smart-home controller displays a layout of the home on the smart-home controller, and indicates the initial location of the smart-home controller and the location of the first smart-home device in the layout.

18. The smart-home system of claim 17, wherein the smart-home controller displays an indication of a path through the layout, from the initial location of the smart-home controller to the location of the first smart-home device.

19. The smart-home system of claim 15, wherein the app is configured to:

accept a selection by the user to provide visual information only or to allow audible information; and issue one or more commands to ones of the smart-home devices, in response to the selection, to provide only visual information to the user, or to allow audible information to be provided to the user.

20. The smart-home system of claim 15, wherein the app is configured to:

determine if a user operating the smart-home controller is a principal user of the first smart-home device;

responsive to determining that the user operating the smart-home controller is not the principal user of the first smart-home device, inform the user operating the smart-home controller of an identity of the principal user; and offer to notify the principal user of the first smart-home device that the replacement battery has been received.

21. The smart-home system of claim 13, wherein the first smart-home device is configured to provide a cue that informs the user of its particular identity as the first smart-home device.

22. A tangible, non-transitory, computer-readable storage medium having instructions stored thereon that, when executed by one or more processors, cause the one or more processors to perform operations including:

measuring, by a first smart-home device of a plurality of smart-home devices in a home, a voltage of a first battery contained in the first smart-home device of the plurality of smart-home devices;

determining from the measured voltage, by one or more of the plurality of smart-home devices, whether replacement of the first battery is warranted;

responsive to determining that replacement of the first battery is warranted, sending, by the one or more of plurality of smart-home devices, an electronic order to a supplier for a replacement battery for the first smart-home device;

reading, by one or more of the plurality of smart-home devices, a machine readable code that accompanies a shipment of the replacement battery;

accessing, by the one or more of the plurality of smart-home devices, a battery order database based on reading the machine readable code that accompanies the shipment of the replacement battery;

determining, based at least in part on information retrieved from the battery order database, a name of the first smart-home device and a location of the first smart-home device within the home, wherein the location is indicative of a name of a room in the home in which the first smart-home device is located; and providing, by one or more of the smart-home devices, a user interface that displays information to a user that guides the user to said location of the first smart-home device, the user interface indicating the name of the first smart-home device and the name of the room in which the first smart-home device is located, wherein the first smart-home device is distinct from the smart-home device of the one or more of the plurality of smart home devices that provides the user interface.

23. The computer-readable storage medium of claim 22, wherein:

reading the machine readable code comprises reading the machine readable code with a smart-home controller; and providing the information comprises:

identifying, with the smart-home controller, an initial location of the smart-home controller within the home; and providing cues to the user to guide the user from the initial location of the smart-home controller to the location of the first smart-home device, the cues including displaying a layout of the home on the smart-home controller, with an indication of a path through the layout, from the initial location of the smart-home controller to the location of the first smart-home device.

24. The computer-readable storage medium of claim 23, further including instructions stored thereon that, when executed by the one or more processors, cause the one or more processors to perform additional operations including:

determining, by the smart-home controller, if a user operating the smart-home controller is a principal user of the first smart-home device; and responsive to determining that the user operating the smart-home controller is not the principal user of the first smart-home device, informing the user operating the smart-home controller of an identity of the principal user.

* * * * *

UNITED STATES PATENT AND TRADEMARK OFFICE
CERTIFICATE OF CORRECTION

PATENT NO.       : 10,102,507 B2
APPLICATION NO.  : 14/496816
DATED            : October 16, 2018
INVENTOR(S)      : Charles Prince Buchbinder Page 1 of 1

It is certified that error appears in the above-identified patent and that said Letters Patent is hereby corrected as shown below:

On the Title Page

Item (54), and in the Specification, Column 1, Line 1, Title: replace "FACILIATE" with --FACILITATE--.

Signed and Sealed this
Fourth Day of December, 2018

Andrei Iancu
*Director of the United States Patent and Trademark Office*